(12) United States Patent
Zupancic

(10) Patent No.: US 10,248,644 B2
(45) Date of Patent: Apr. 2, 2019

(54) METHOD AND SYSTEM FOR TRANSFORMING UNSTRUCTURED TEXT TO A SUGGESTION

(71) Applicant: WRIBER INC., Kitchener (CA)

(72) Inventor: John Zupancic, Kitchener (CA)

(73) Assignee: WRIBER INC., Waterloo, Ontario (CA)

(*) Notice: Subject to any disclaimer, the term of this patent is extended or adjusted under 35 U.S.C. 154(b) by 370 days.

(21) Appl. No.: 14/685,583

(22) Filed: Apr. 13, 2015

(65) Prior Publication Data

US 2016/0103824 A1  Apr. 14, 2016

Related U.S. Application Data

(63) Continuation-in-part of application No. 14/512,195, filed on Oct. 10, 2014, now Pat. No. 9,740,737.

(51) Int. Cl.
| | |
|---|---|
| G06F 17/30 | (2006.01) |
| G06F 17/27 | (2006.01) |
| G06F 17/21 | (2006.01) |
| G06F 17/22 | (2006.01) |

(52) U.S. Cl.
CPC ........ *G06F 17/2705* (2013.01); *G06F 17/218* (2013.01); *G06F 17/2229* (2013.01); *G06F 17/2247* (2013.01); *G06F 17/274* (2013.01); *G06F 17/2775* (2013.01); *G06F 17/3064* (2013.01); *G06F 17/30637* (2013.01); *G06F 17/30731* (2013.01); *G06F 17/30864* (2013.01)

(58) Field of Classification Search
CPC .. G06F 17/271; G06F 17/277; G06F 17/2785; G06F 17/274; G06F 17/3064; G06F 17/27; G06F 17/218; G06F 17/2229; G06F 17/2247; G06F 17/2705; G06F 17/2775; G06F 17/30011; G06F 17/3061; G06F 17/30731; G06F 17/30864
See application file for complete search history.

(56) References Cited

U.S. PATENT DOCUMENTS

| | | | | |
|---|---|---|---|---|
| 6,715,762 | B2* | 4/2004 | Simmons | .................. A63F 9/18 |
| | | | | 273/148 R |
| 7,542,951 | B1* | 6/2009 | Chakrabarti | ......... G06N 99/005 |
| | | | | 706/45 |
| 7,677,896 | B1* | 3/2010 | Sonwalkar | ............... G09B 7/00 |
| | | | | 434/236 |

(Continued)

*Primary Examiner* — Merilyn P Nguyen
(74) *Attorney, Agent, or Firm* — Aird & McBurney LP

(57) ABSTRACT

A system for transforming unstructured text into at least one suggestion for content creation, the system having: a tagging module having instructions in memory, said instructions executable by a processor to receive unstructured text from external sources having at least one sentence; disassemble said at least one sentence into individual words; and tag said individual words by determining a speech type for each of said individual works; a chunking module having instructions in memory, said instructions executable by a processor to said individual words together into phrases to form a tree-like structure of the text, when said individual words are tagged correctly; and a suggestion module having instructions in memory, said instructions executable by a processor to generate said at least one suggestion based on said chunking.

18 Claims, 26 Drawing Sheets

(56) References Cited

U.S. PATENT DOCUMENTS

| | | | | |
|---|---|---|---|---|
| 8,688,698 B1* | 4/2014 | Black | ................... | G06F 17/3064 |
| | | | | 707/708 |
| 2002/0049783 A1* | 4/2002 | Berk | ...................... | G06Q 30/02 |
| | | | | 715/202 |
| 2004/0009462 A1* | 1/2004 | McElwrath | .............. | G09B 7/00 |
| | | | | 434/350 |
| 2008/0046829 A1* | 2/2008 | Leong | ..................... | B42C 19/02 |
| | | | | 715/764 |
| 2011/0208758 A1* | 8/2011 | Yehaskel | ............ | G06F 17/2795 |
| | | | | 707/752 |
| 2011/0295878 A1* | 12/2011 | Bennett | ................ | G06F 17/274 |
| | | | | 707/769 |
| 2013/0096909 A1* | 4/2013 | Brun | .................... | G06F 17/271 |
| | | | | 704/9 |
| 2013/0317966 A1* | 11/2013 | Bass | ..................... | G06Q 30/02 |
| | | | | 705/37 |
| 2014/0195464 A1* | 7/2014 | Flinn | ....................... | G06N 7/02 |
| | | | | 706/11 |

* cited by examiner

METHOD AND SYSTEM FOR TRANSFORMING UNSTRUCTURED TEXT TO A SUGGESTION

CROSS-REFERENCE TO RELATED APPLICATIONS

This application is a continuation-in-part of U.S. Non-Provisional application Ser. No. 14/512,195, filed on Oct. 10, 2014.

FIELD OF THE INVENTION

The present invention relates to a method and system for content creation, more particularly it relates to a method and system for aiding in creating content by providing automatic content suggestions and engagement suggestions.

DESCRIPTION OF THE RELATED ART

Writing is an activity that is common across many professions and scholastic disciplines. Written works include, but are not limited to, books, blogs, articles, reports, essays, letters, e-mails, manuals, web pages, social media, content marketing, white papers, case studies, nurturing emails, and instant messaging. As any writer is acutely aware of, the pursuit of writing can be extremely challenging at times, as it is often a slow and time-consuming process. For example, it is not uncommon for authors to lack inspiration or creativity, which typically leads to writer's block. This is further exacerbated by the fact that most authors, such as writers, journalists, news bloggers, part-time/full-time bloggers are usually under tremendous pressure to turn around high quality work products despite being under considerable time constraints and budgets. In addition, these authors are often faced with the challenge of conjuring up novel and interesting topics to write about. Also, given the 24/7 news cycle there is great demand for contemporaneous articles, or constant article updates on journalists or bloggers.

Given the popularity of social media and in particular blogging, writing is no longer the domain of trained journalists, columnists, editors, or professional writers, and some of these burgeoning authors are not aware of the tenets that a good piece of written work should at least address, that is, the "Five Ws", namely: "Who"; "What"; "When"; "Where" and "Why"; and the "One H", that is, "How", among other principles. Even those aware of these basic principles of story writing often find it difficult to answer those "Five Ws" and "One H" effectively, and may simply not have immediate and convenient access to the relevant information. Typically, an author confronted with these writing principles is forced to temporarily abandon writing the piece, perform the requisite research, typically on the World Wide Web to gather the relevant information, make notations, bookmark relevant the web resources, and then resume writing. This process is generally considered to be disruptive, time-consuming, inefficient, and onerous, as the author is tasked to assemble all the relevant information and have that information readily available before authoring a piece of written work. Inevitably, some of the relevant details are simply not discovered during the author's search, and some of the information discovered by the author may be omitted from the written work as the author may fail to recall the information, or is unable to locate it. Those authors lacking any journalistic background may find it even more challenging to structure a story based on the above-noted writing principles.

It is an object of the present invention to mitigate or obviate at least one of the above-mentioned disadvantages.

SUMMARY OF THE INVENTION

In one of its aspects, there is provided a computer-implemented method for providing at least one suggestion for content creation, a computing device having a processing structure; and a memory including instructions, wherein said memory and said instructions are configured, with said processing structure, to cause said processing structure to:
receive unstructured text from external sources having at least one sentence;
disassemble said at least one sentence into individual words;
tag said individual words by determining a speech type for each of said individual works;
when said individual words are tagged correctly, chunk said individual words together into phrases to form a tree-like structure of the text;
generate said at least one suggestion based on said chunking;
determine whether said at least one suggestion has the proper tense and singular/plural form; and
provide said at least one suggestion when said at least one suggestion has the proper tense and singular/plural form.

In yet another of its aspects, there is provided a system for transforming unstructured text into at least one suggestion for content creation, the system having:
a tagging module having instructions in memory, said instructions executable by a processor to receive unstructured text from external sources having at least one sentence; disassemble said at least one sentence into individual words; and tag said individual words by determining a speech type for each of said individual works;
a chunking module having instructions in memory, said instructions executable by a processor to said individual words together into phrases to form a tree-like structure of the text, when said individual words are tagged correctly; and
a suggestion module having instructions in memory, said instructions executable by a processor to generate said at least one suggestion based on said chunking; determine whether said at least one suggestion has the proper tense and singular/plural form; and provide said at least one suggestion when said at least one suggestion has the proper tense and singular/plural form.

In yet another of its aspects, there is provided a system for transforming unstructured text into at least one suggestion for content creation, the system having:
a tagging module having instructions in memory, said instructions executable by a processor to receive unstructured text from external sources having at least one sentence; disassemble said at least one sentence into individual words; and tag said individual words by determining a speech type for each of said individual works;
a chunking module having instructions in memory, said instructions executable by a processor to said individual words together into phrases to form a tree-like structure of the text, when said individual words are tagged correctly; and
a suggestion module having instructions in memory, said instructions executable by a processor to generate said at least one suggestion based on said chunking Advantageously, during authorship of a written work, the computer-implemented process provides suggestions and poses relevant, open-ended questions in real-time, and thus provokes the author to contemplate previously non-considered subject matter that may be incorporated in the written work. Accordingly, in another aspect, the invention assists in structuring the content flow, improves the quality of the work, and allows authors, such as, bloggers, journalists, content creators, publishers, students, academics, and marketers, to create original, relevant, and interesting contemporaneous content that engages a target audience. The system allows authors to research, outline and write their content using real-time dynamic writing prompts based on the content being written. Furthermore, the system analyses the created content and learns the author's writing style to present substantially thought-provoking suggestions.

In addition, the system provides increased power, ease and speed combined with workflow integration and flexibility to help the user create compelling content, compared to other prior art systems.

BRIEF DESCRIPTION OF THE DRAWINGS

Several exemplary embodiments of the present invention will now be described, by way of example only, with reference to the appended drawings in which.

DETAILED DESCRIPTION OF EXEMPLARY EMBODIMENTS

The detailed description of exemplary embodiments of the invention herein makes reference to the accompanying block diagrams and schematic diagrams, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

Moreover, it should be appreciated that the particular implementations shown and described herein are illustrative of the invention and its best mode and are not intended to otherwise limit the scope of the present invention in any way. Indeed, for the sake of brevity, certain sub-components of the individual operating components, conventional data networking, application development and other functional aspects of the systems may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Figure 1:
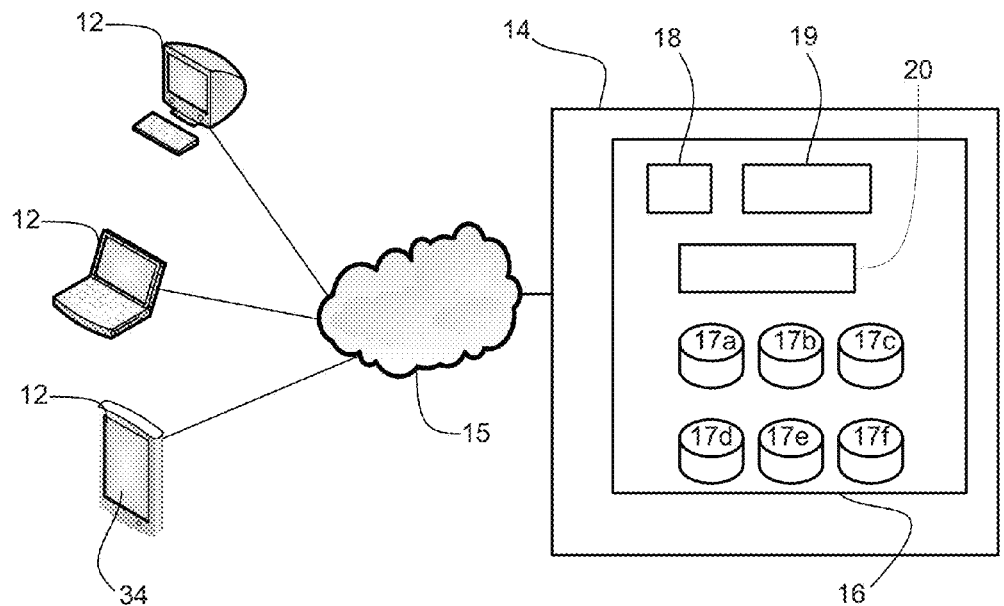
FIG. 1 is a top-level component architecture diagram of an exemplary system.

FIG. 1 shows a top-level component architecture diagram of an exemplary system 10 for performing a content creation method. The system 10 generally includes one or more user devices 12 coupled to a remote computing system 14 via a communications network 15, such as the Internet, and/or any other suitable network. The remote computing system 14 comprises a content creation platform 16 which generally includes one or more databases 17a, 17b, 17c, 17d, 17e, and 17f, which may be any type of data repository or combination of data repositories, which store records or other representations of data, such as web pages that have been indexed by a crawler program. Alternatively, databases 17a, 17b, 17c, 17d, 17e, and 17f may be included in a single database. The content platform 16 also comprises an aggregator 18 for collecting information related to the content being created, an analysis engine module 19 for performing one or more analyses of the content, as will be described in greater detail herein. A suggestion engine module 20, coupled to the analysis engine module 19, generates and sends content suggestions to the user devices 12.

Figure 2:
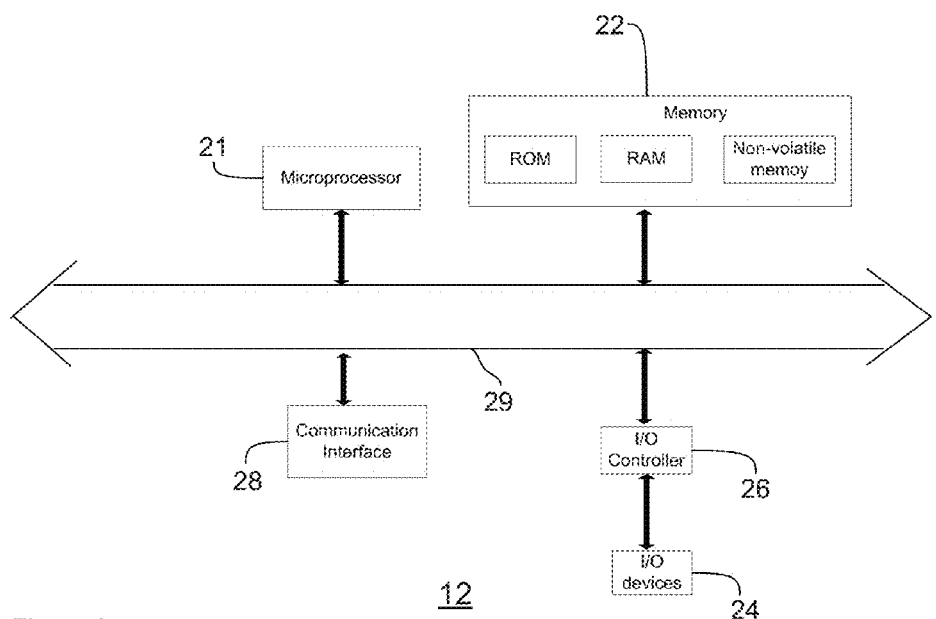
FIG. 2 shows a schematic diagram of a general purpose computer system.

Many of the methods of the invention may be performed with a digital processing system, such as a conventional, general purpose computer system. Special purpose computers which are designed or programmed to perform only one function may also be used. FIG. 2 shows a schematic diagram of a user device 12 depicted as a general-purpose computer system in which a system for content creation operates. The user device 12 may be a general-purpose computer system comprising, for example, a processing unit, such as processor 21, system memory 22. The computer system 12 also includes as input/output (I/O) devices 24 coupled to the processor 21 via an I/O controller 26. The input/output (I/O) devices 24, for example, a keyboard, mouse, trackball, microphone, touch screen, a printing device, display screen, speaker, etc. A communications interface device 28 provides networking capabilities using Ethernet, WiFi™, and/or other suitable network format, to enable connection to shared or remote drives, one or more networked computers, or other networked devices, via the communications network 15. The components of computer system 12 may be coupled by an interconnection mechanism 29, which may include one or more buses (e.g., between components that are integrated within a same machine) and/or a network (e.g., between components that reside on separate discrete machines). The interconnection mechanism 29 enables communications (e.g., data, instructions) to be exchanged between system components of computer system 12.

Various aspects of the invention may be implemented as specialized software executing in one or more computer systems communicating over network 15, whereby a processor 21, associated with one or more computer systems, executes sequences of instructions contained in memory 22, such as a machine readable medium. The machine readable medium includes any mechanism that provides (i.e., stores and/or transmits) information in a form accessible by a machine (e.g., a computer, network device, personal digital assistant, a smartphone, any device with a set of one or more processors, etc.). For example, machine readable media includes recordable/non-recordable media (e.g., read only memory (ROM); random access memory (RAM); magnetic disk storage media; optical storage media; flash memory devices; a hard disk drive, etc.), as well as electrical, optical, acoustical or other forms of propagated signals (e.g., carrier waves, infrared signals, digital signals, etc.).

Figure 3:
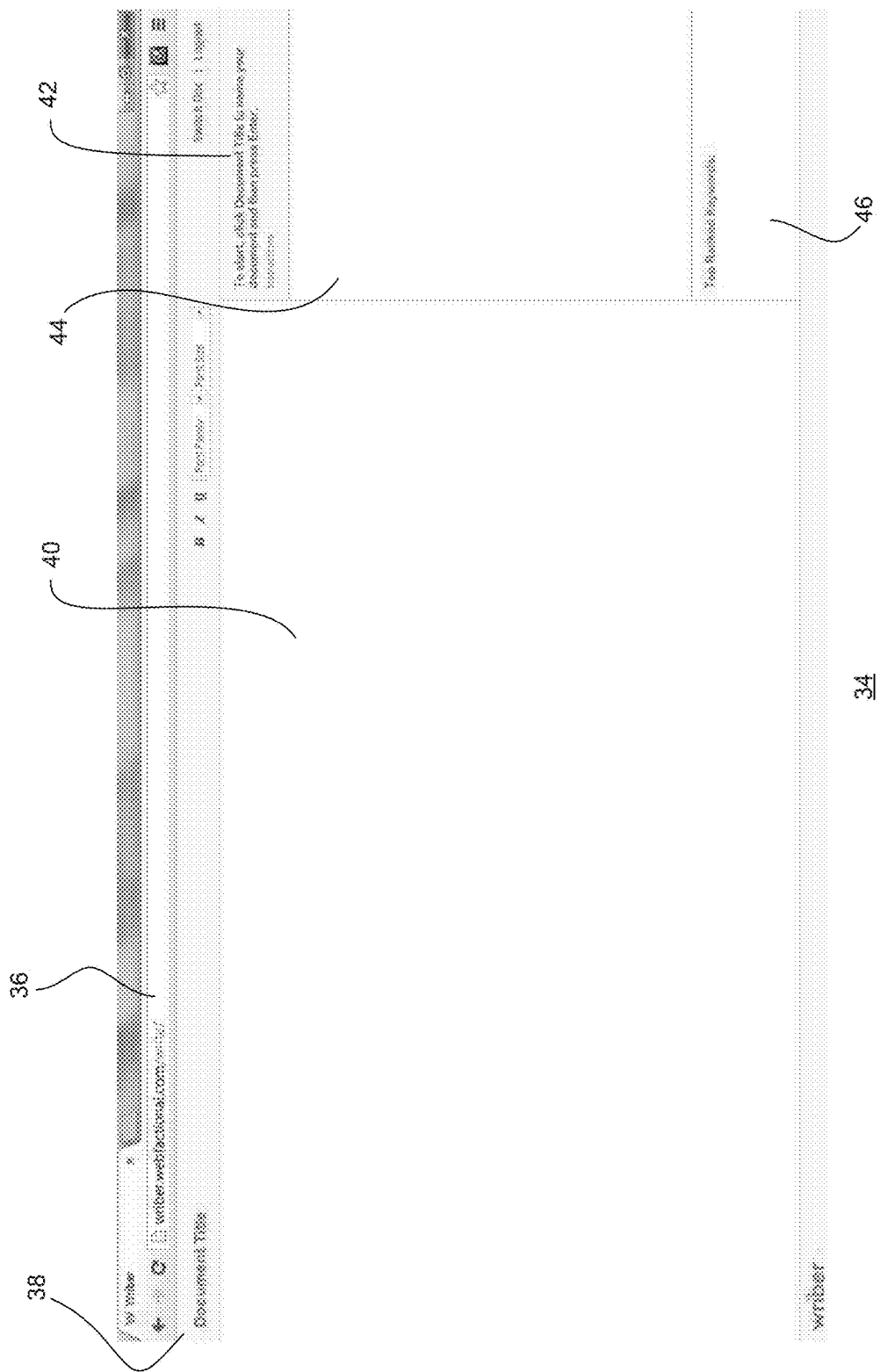
FIG. 3 is an exemplary user interface.

In one exemplary embodiment, the memory 22 includes a browser client 30 (e.g., a web browser) (not shown) having executable instructions to present a browser page 32 on a display or user interface 34 capable of presenting graphics, text, icons, audio, video, and any combination thereof, as shown in FIG. 3. The browser page 32 comprises an address field 36, a title input field 38 (e.g., a text entry field, in this example) for allowing a user to enter a document title, and a content frame 40 for inputting content related to the title, such as a free-form textual input box. The browser page 32 also comprises an instructions frame 42, a content suggestion frame 44 for providing suggestions and posing questions, and a keyword frame 46 for displaying top ranked words. The browser page 32 may also include drop-down menus, and buttons associated with font size, font type, login/logout, settings, among others.

Figure 4A:
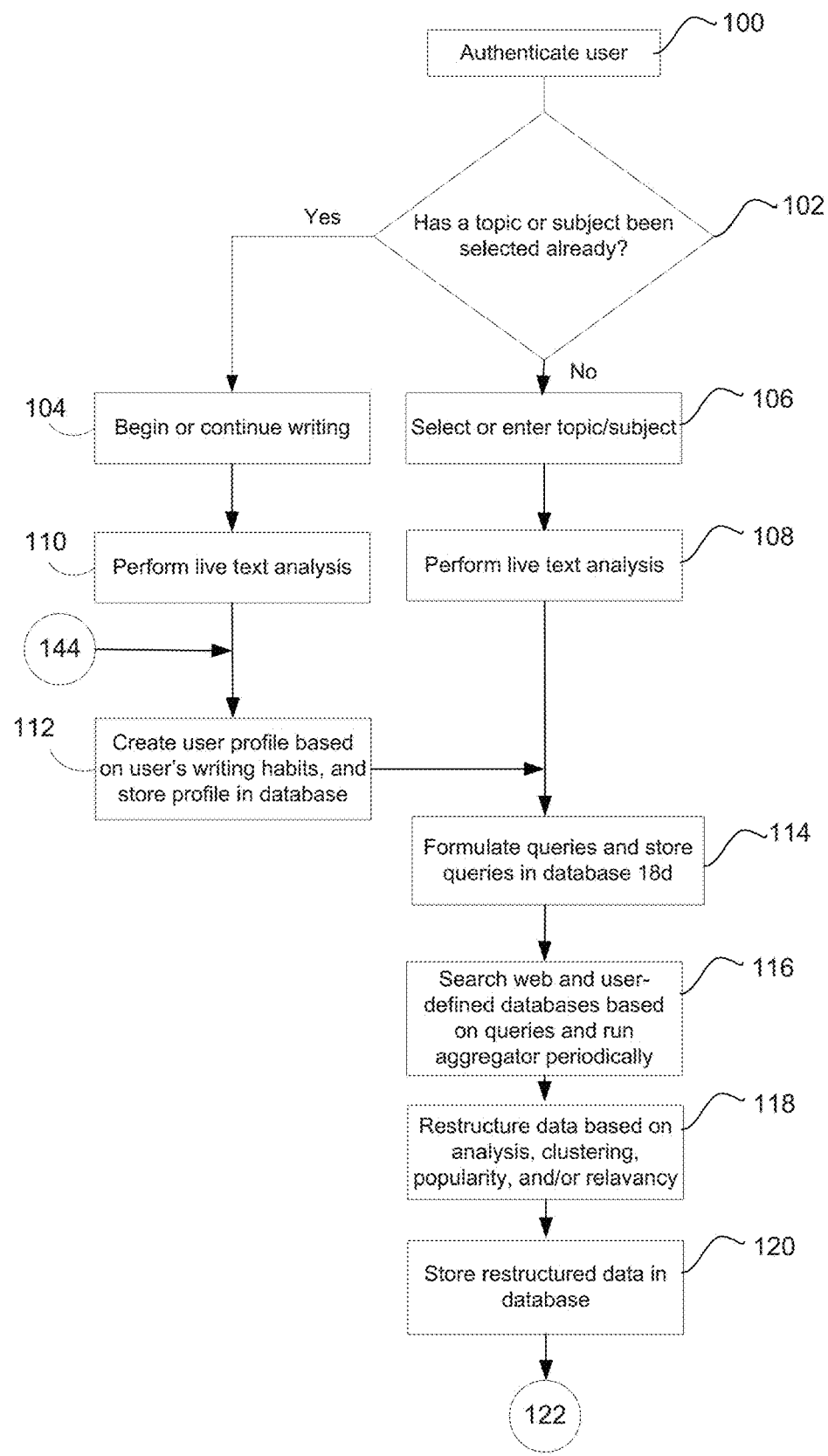
FIGS. 4a, 4b and 4c show a high level flow diagram illustrating an exemplary content creation process.
Figure 4B:
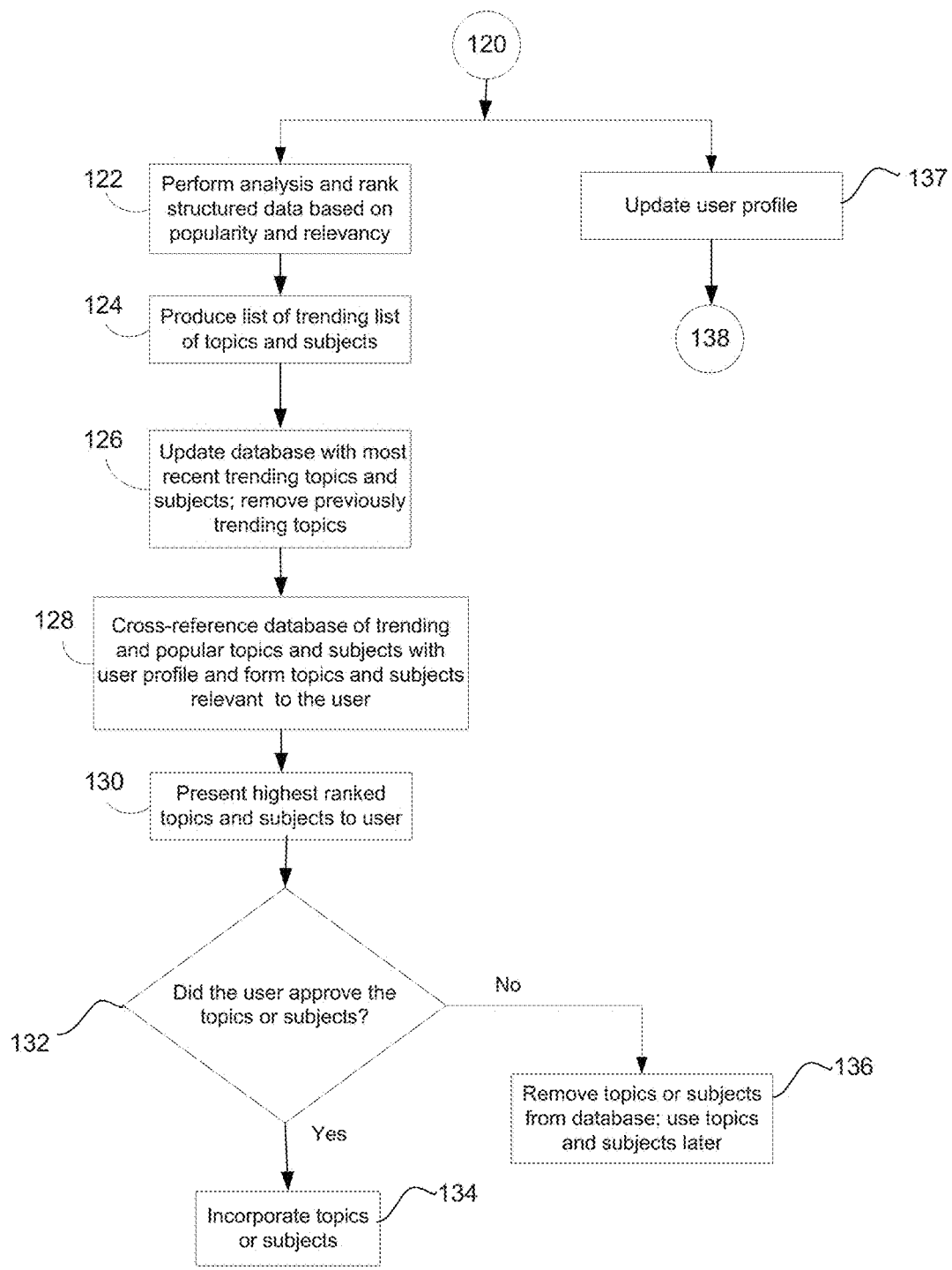
Figure 4C:
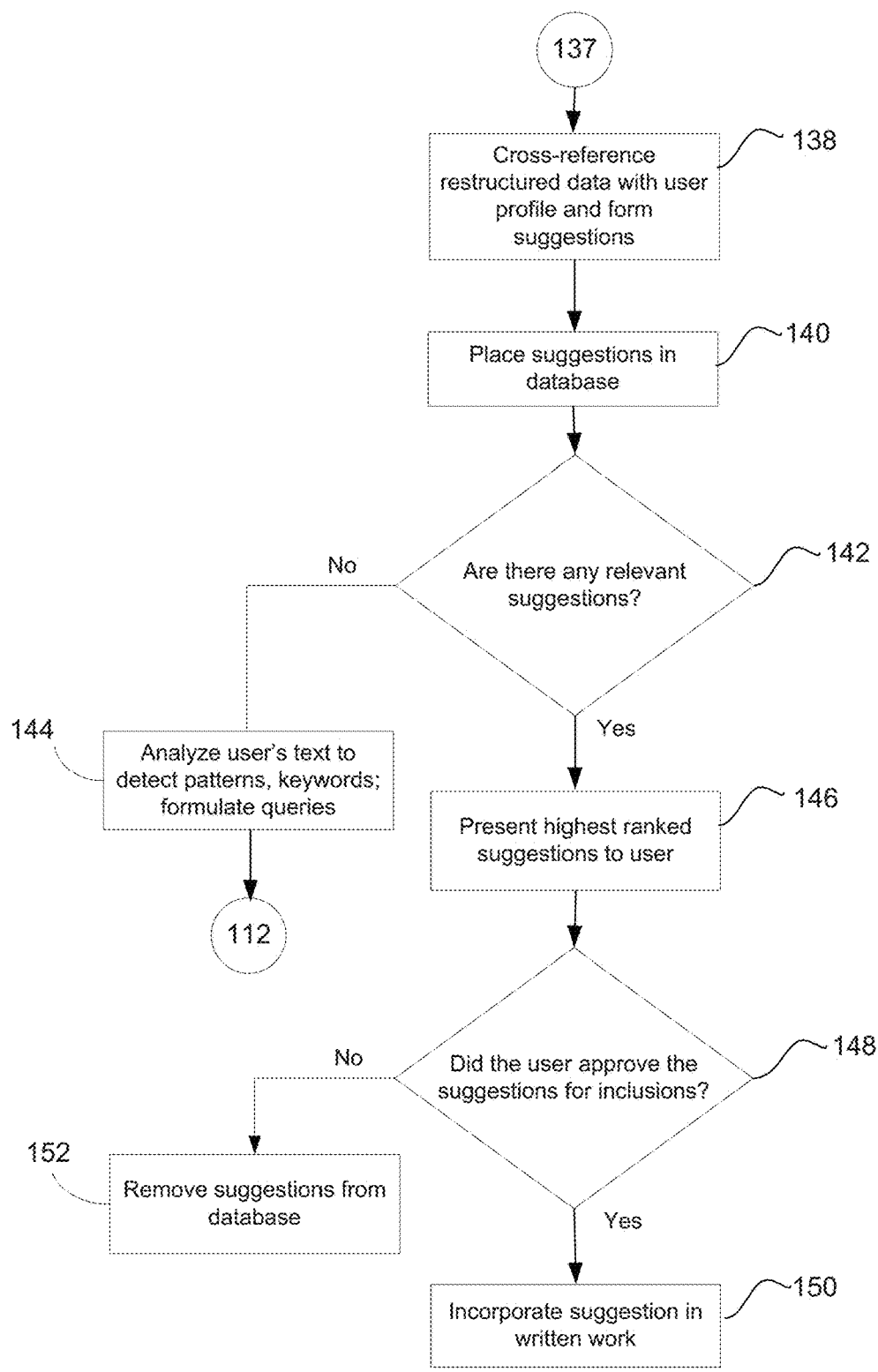
Figure 5A:
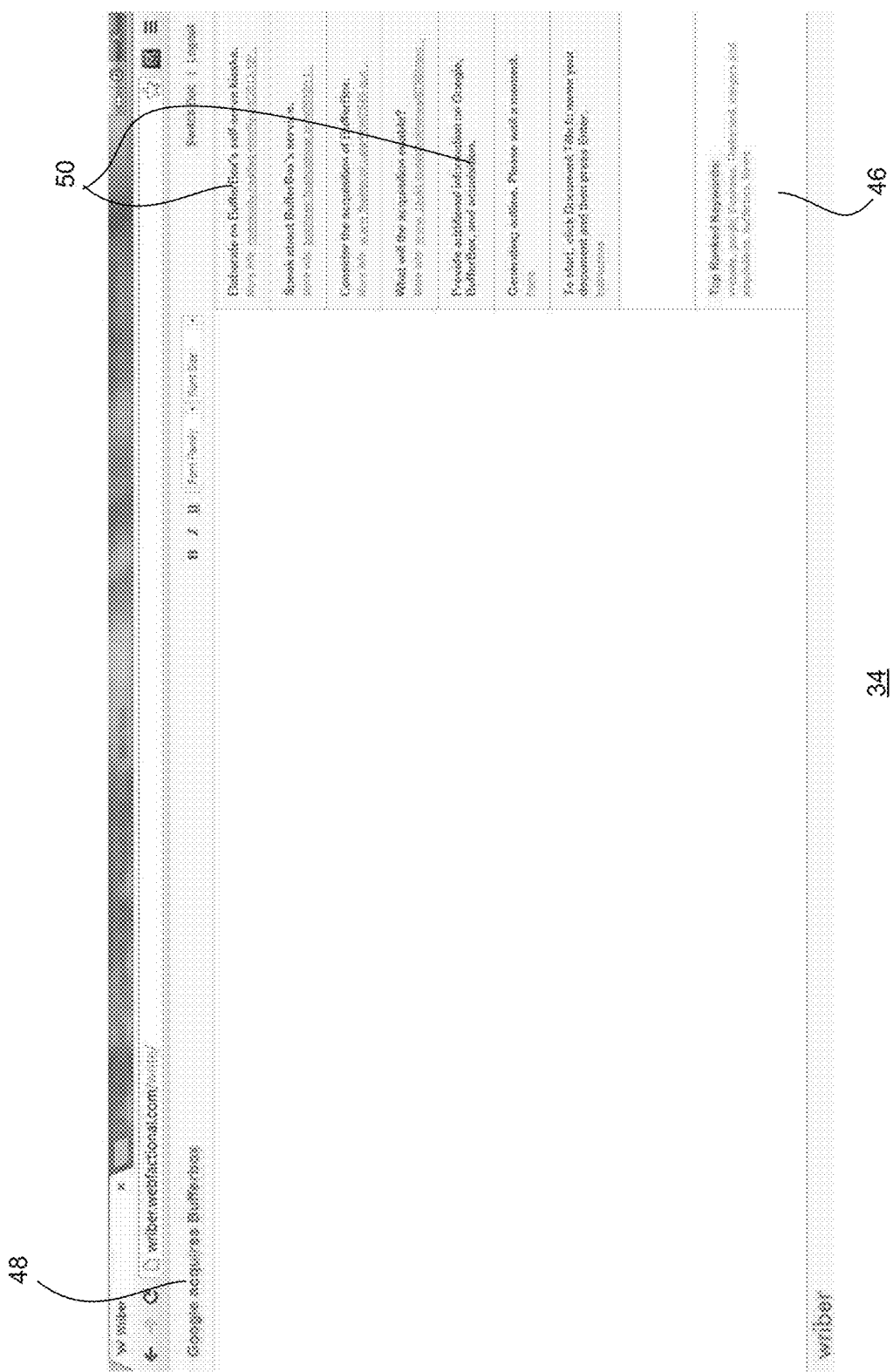
FIG. 5a is another exemplary user interface.

With reference to FIGS. 4a, 4b and 4c, there is shown a high level flow diagram illustrating an exemplary content creation process via user interface 34. Turning to FIG. 4a, following a user login and authentication process (step 100), the user is presented with a list of topics or subjects that the user might be interested in writing about on user interface 34. Alternatively, the user can disregard the presented topics or subjects and enter his or her own title in the title input field 38 (step 102). If a topic or subject has already been chosen, or the title was previously entered from a previous writing session then the user can continue writing the saved written work in the content frame 40 (step 104), otherwise the user selects a topic or subject to write about from the available list (step 106). In one example, the user chooses the subject title "Google acquires BufferBox" 48, as shown in FIG. 5a. The title text is provided to the analysis engine module 19 which performs at least one of a lexical, syntactic and semantic analysis of the title 48 (step 108) using parsing algorithms, including machine learning technologies, or artificial intelligence. Alternatively, as the user begins authoring a written work, the analysis engine module 19 also performs a similar analysis of the inputted text in the content frame 40 to discover any patterns, key words, and frequency of words, themes or phrases (step 110). Accordingly, the analysis engine module 19 may also create a user's writing profile based on the user's writing habits (step 112). Generating a user's writing profile may also involve forms of machine learning. Next, queries corresponding to the title or chosen topic or subject, and live text from the user are formulated and stored in database 17d (step 114). Aggregator 18 is scheduled to run periodically, such as on a thirty minute interval, and accumulates trending topics and subjects for the all the users using the platform 16. Aggregator 18 includes a web scraper configured to automatically collect information from the World Wide Web, or relevant documents in the pre-selected databases and/or search engine results which contain information and data related to the topic or subject, or inputted text (step 116). Exemplary databases may include Google®, Bing®, Yahoo® and Wikipedia®. The information may include any of the following: text, documents, social media posts, audio, video, images, URIs, URLs, and so forth. The aggregated content is stored in a database 17a, and a further lexical, syntactic and semantic analysis routine is performed on the web scraper results data (step 118), and the data is restructured stored in a database 17e (step 120). Alternatively, a suggestion generated in step 140 in FIG. 4c may be "looked up" or referenced.

In the next step 122, the analysis engine module 19 ranks the structured data based on popularity and relevancy and produces a list of trending topics and subjects (step 124) corresponding to the chosen title, topic or subject. Database 17a with current trending topics and subjects is updated to include the most recent trending topics and subjects; and previous trending topics and subjects are removed (step 126). Alternatively, previous trending topics and subjects are ranked lower than the most current trending topics. Next, database 17b of trending topics and subjects is cross-referenced with the user's writing profile by the suggestion engine 20 in order to form initial topics and subject suggestions relevant to the user on display 34 (step 128).

In the next step 130, the initial topics and subjects are presented to the user, and the user then decides whether or not to approve the topics or subjects suggestions (step 132). When the user approves the topics or subjects suggestions, then those topics or subjects suggestions are incorporated into the written work (step 134), otherwise the topics or subjects are removed from database 17b or are ranked lower (step 136). When the user selects the automatically suggested topic or subject, or enters his or her own topic or subject, the topic or subject is inserted into the written work, and the suggestion engine module 20 generates an outline for the written work corresponding to the suggestions. As the user continues to input text into the content frame 40, the system 10 continually updates the user's writing profile by tracking the topics and subjects, writing patterns, keywords, repetition, approved suggestions, disapproved suggestions, including the user's own criteria. Therefore, database 17b facilitates improved search functions, analysis functions, topic generation, topic wording, topic relevancy, suggestion generation, suggestion wording, and suggestion relevancy.

In parallel with step 122, the user's writing profile is updated with the topic or subject selections using the relevant parts of the restructured web data and the user's usage information (step 136), and increased use of the system 10 further shapes and fine-tunes the user's writing profile, which culminates in more accurate results from the suggestion engine module 20. The restructured web data is then cross-referenced with an individual's user writing profile in database 17b in order to generate initial content suggestions for the user to input relevant content in content frame 40 (step 138). In particular, the suggestion engine module 20 forms content suggestions based on what the individual user is most likely to respond to. These suggestions are then ranked based on their relevancy to the topic or subject. Such suggestions, including questions, consist of materials or subject matter not yet considered by the user and are presented on the user interface 34 so as to provoke thinking, and assist in structuring the content flow. The initial content suggestions are then placed in a database 17*f* (step 140). In the next step 142, a determination is made whether any of the suggestions are relevant to the topic or subject. When none of the content suggestions are deemed relevant the analysis engine module 19 then performs an analysis of the user's inputted text content in content frame 40 to detect patterns, keywords in order to reformulate further meaningful queries (step 144), and process loops back to step 116. However, when the suggestions are deemed relevant then the highest ranking suggestions are presented to the user in the content suggestion frame 44 (step 146). Generally, the top ranked suggestions are selected based on both the ranking of the suggestions and the likelihood that the user will respond positively to that particular suggestion. Next, the user decides whether or not to approve the suggestions (step 148), when the user approves the suggestions then the suggestions are incorporated into the created content or written work (step 150), otherwise the suggestions are removed from the database or are ranked lower, and maintained in the database 16 for later use (step 152).

Now turning to FIG. 5*a*, there is shown an exemplary screenshot having a chosen title "Google acquires BufferBox" 48, and a plurality of suggestions and questions or dynamic writing prompts 50 are generated by the suggestion module 20, in suggestion frame 44. Exemplary suggestions and questions pertaining to the title 48 include, but are not limited to, "Elaborate on BufferBox's selfserve kiosks."; "Speak about BufferBox's service."; "Consider the acquisition of BufferBox"; "What will the acquisition enable"; "Provide additional information on Google, BufferBox", and "acquisition". The suggestions or dynamic writing prompts may assist the user with the next word or words of the next sentence. For instance, when the following sentence is inputted, "The search giant has just bought BufferBox.", suggestions such as, "Google acquired BufferBox for . . . " or "Google can expand their . . . " may be automatically generated. Any of the suggestions and questions may include at least one uniform resource indicator locator (URI) or link pertaining to the suggestion or question. The URI is used to identify resources within computers and computer networks, such as a uniform resource indicator locator (URL), or identify resources available locally on a computer such as documents, folders or services. Suggestions may also include a summary of the page where the suggestion was found on, facts from that page, quotes found on that page, additional information about the suggestion, metrics about the importance/relevance of the suggestion.

Figure 5B:
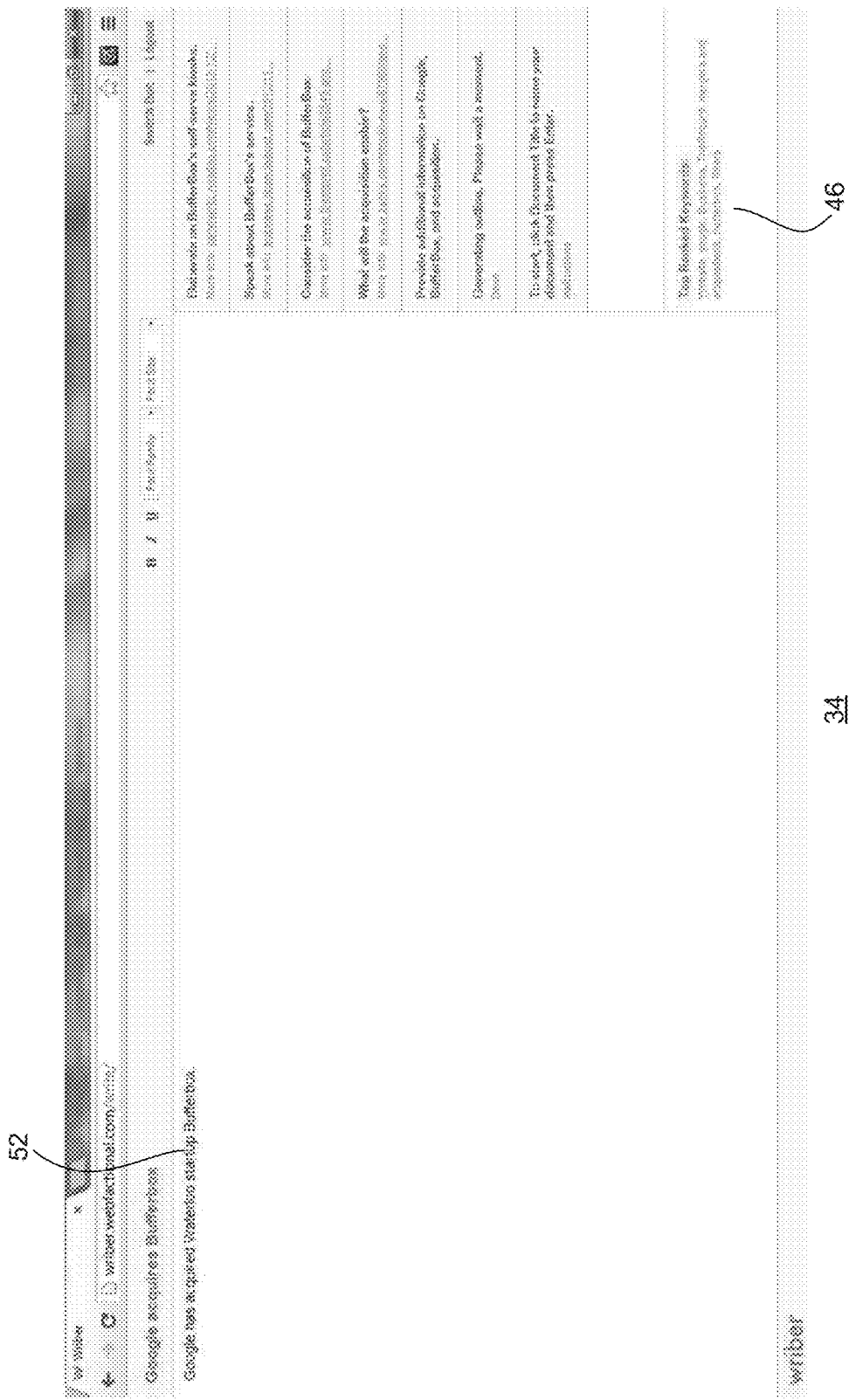
FIG. 5b is yet another exemplary user interface.

In addition, the analysis engine module 19 returns a set of keywords which are presented to the user ordered in accordance with ranking criteria in the persistent keyword frame 46. Alternatively, the keywords may be displayed in a non-persistent frame, or window or other ways. Exemplary keywords pertaining to the above-noted title may include, but are not limited to, "website", "Google", "mergers and acquisitions", and "BufferBox". The box 44 may include alerts pertaining to the user's writing style, which allow the user to tweak his or her content for improved engagement with the target reader, as will be described below. In FIG. 5*b*, following a review of the suggestions and questions, the user begins, or continues, to input text 52 in the content frame 40, spurred on by the content suggestions and questions. Once completed, the written work may be exported to other platforms for publication, posting, or printing.

Figure 6A:
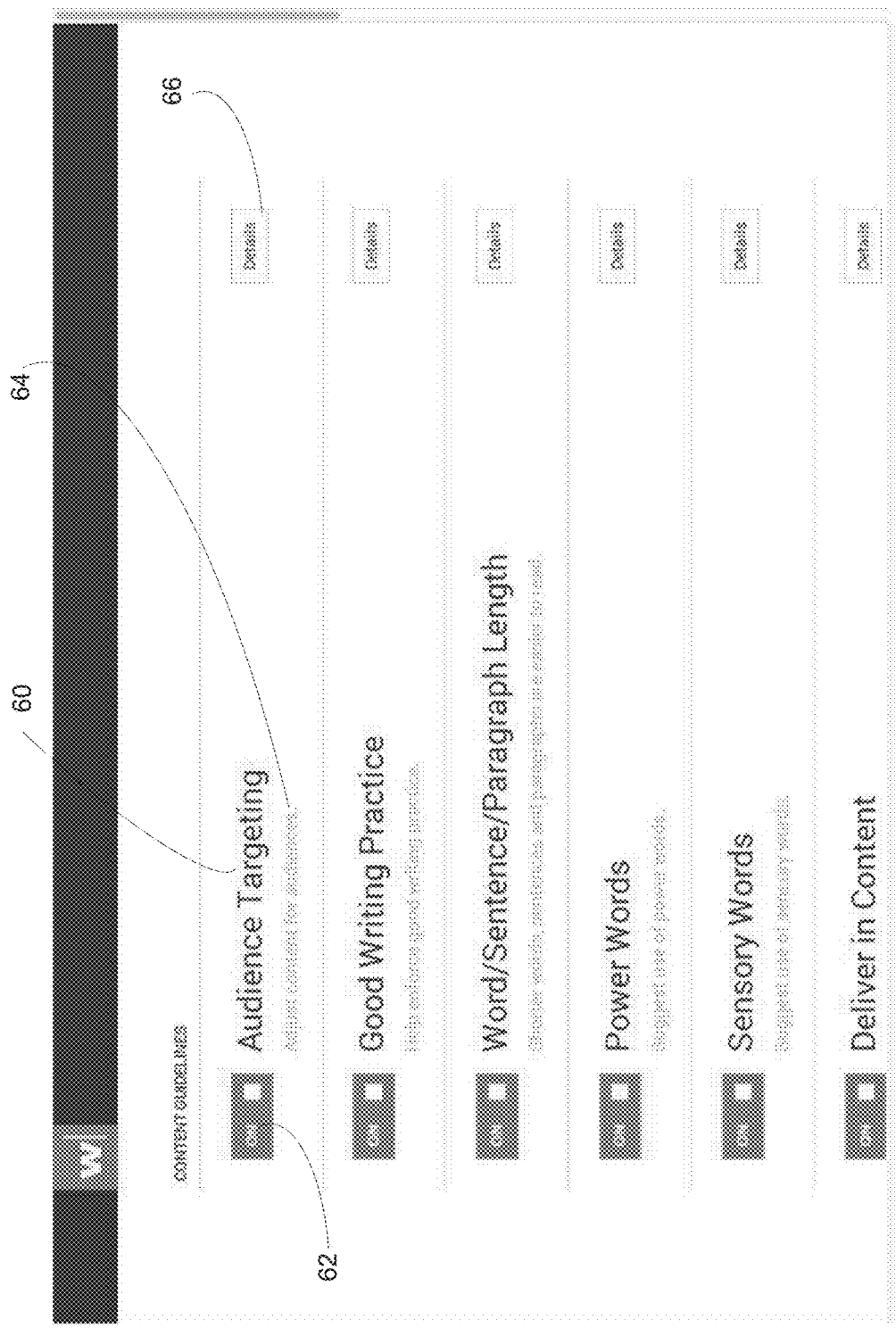
FIG. 6a is an exemplary user interface showing user writing profile configuration options.

FIG. 6*a* shows a user configuration screenshot with a plurality of content guidelines options 60, which may be activated or deactivated using button 62. Each option 60 includes a brief description 64 and detailed information accessible by selecting button 66. For example, the options may include: "Audience Targeting", which allows the user to adjust the content for alignment with the target audience; "Good Writing Practice", which assists in maintaining and enhancing good writing practice; and "Word/Sentence/Paragraph Length", which encourage the user to use shorter words, sentences and paragraphs for easier reading. Other options may include: "Power Words"; Sensory Words; and "Deliver in Content", among others.

Figure 6B:
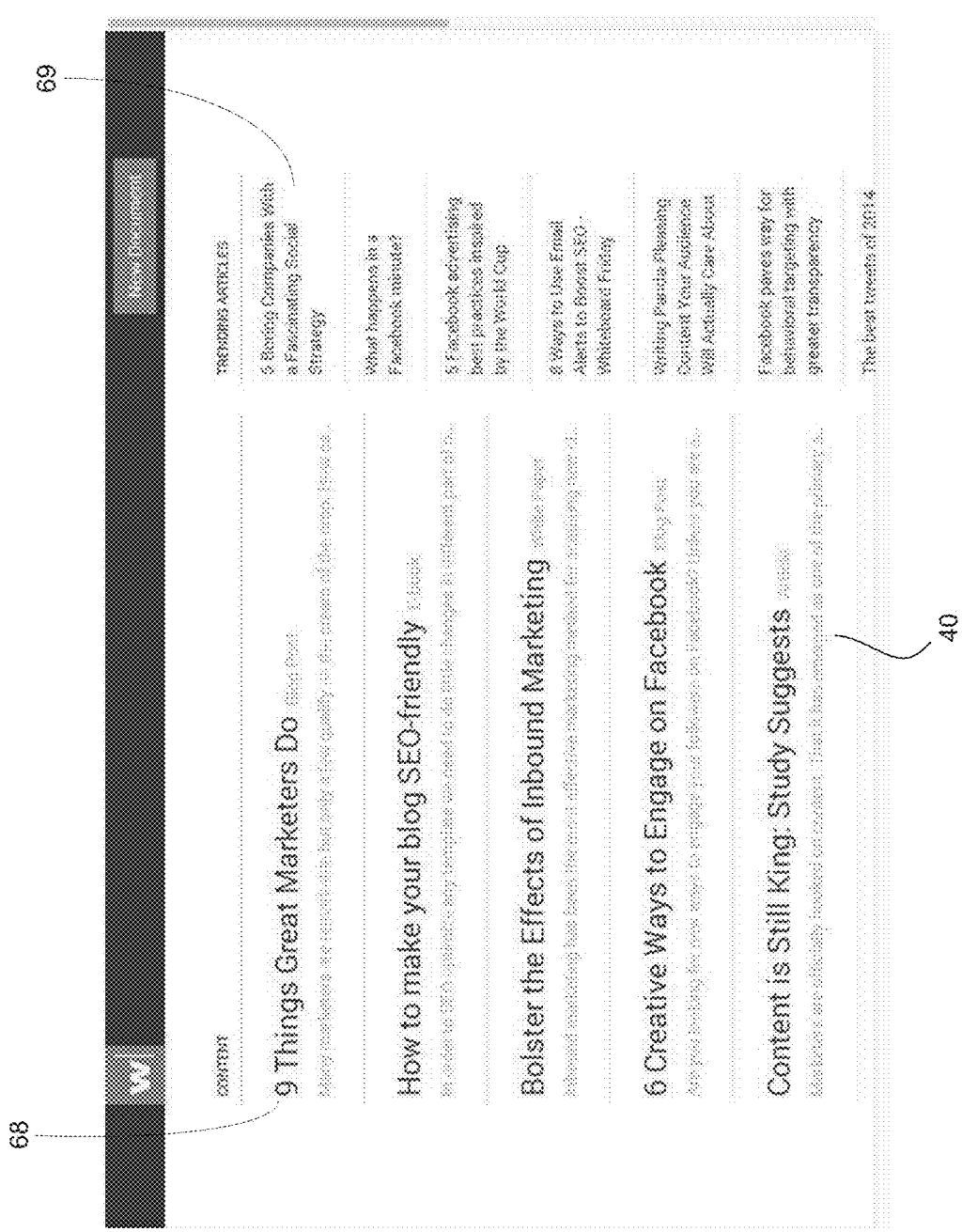
FIG. 6b is another exemplary user interface with a list of created content.

FIG. 6*b* shows an exemplary content page with a list of created content 68 in the content frame 40 and a plurality of popular or trending articles 69. Each created content 68 comprises a title, type of content, such as blog post, e-book, white paper or article, and a brief summary of the created content, or opening sentence, or partial opening sentence, of the piece.

Figure 6C:
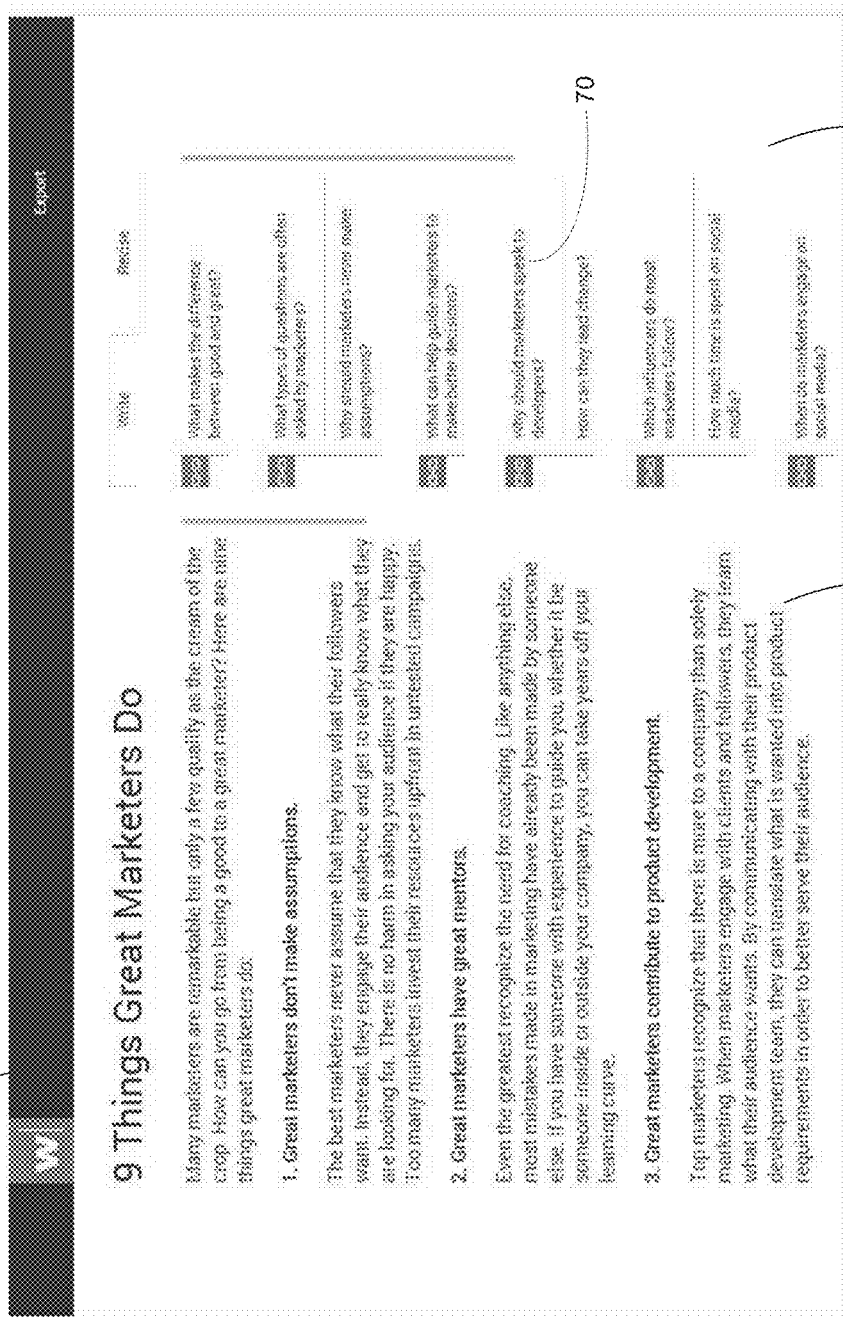
FIG. 6c is an exemplary user interface showing exemplary content suggestions.

FIG. 6*c* shows a screenshot of an exemplary blog post chosen from FIG. 6*b*, entitled "9 Things Great Marketers Do", in the content frame 40. The content suggestion frame 44 includes a plurality of questions 70 to assist the user with creating more content for the piece. Exemplary suggestions include: "What makes the difference between good and great?"; "What types of questions are often asked by marketers?"; "What can help guide marketers to make better decisions"; and "Which influencers do most marketers follow?"; among others.

Figure 6D:
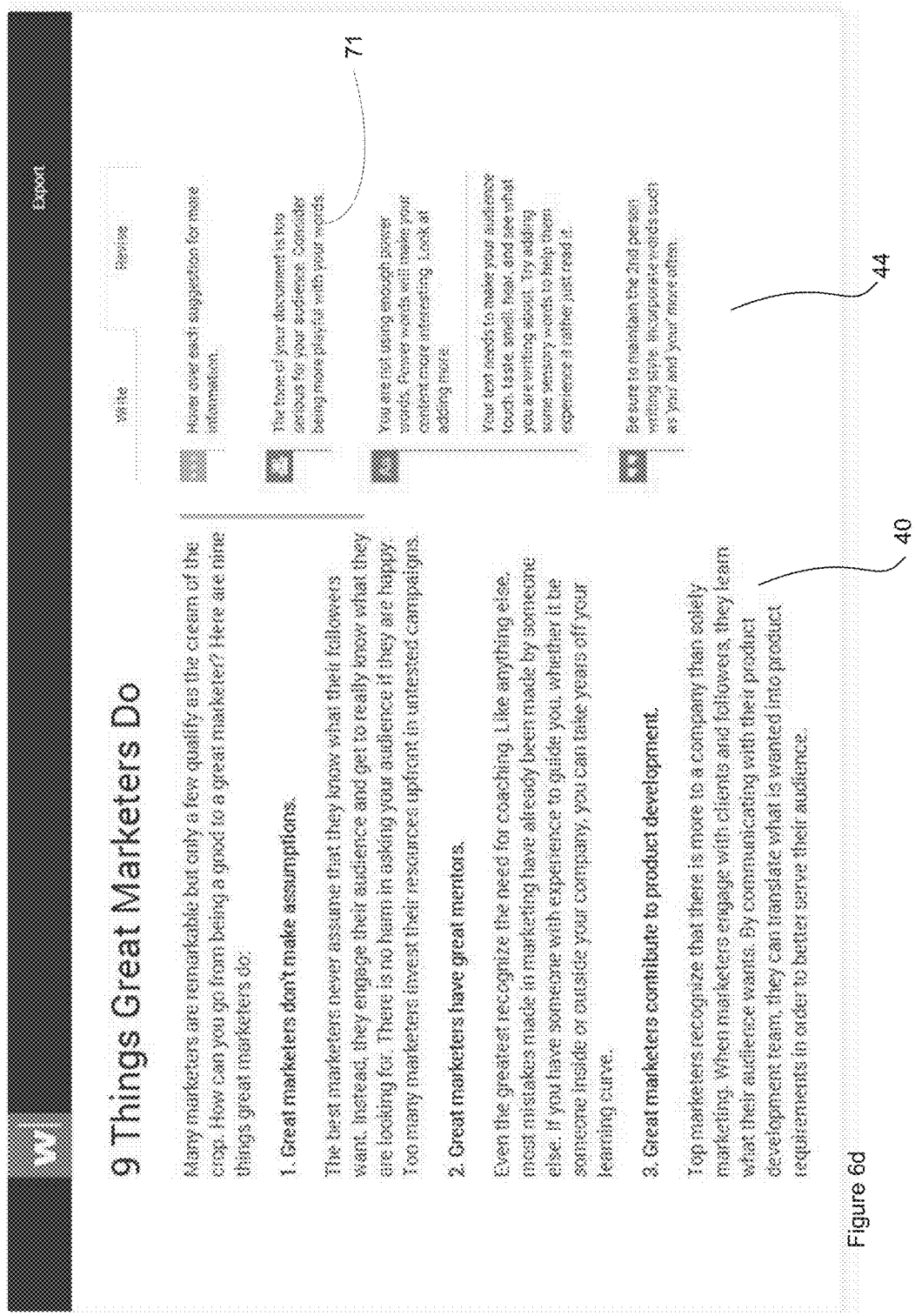
FIG. 6d is yet another exemplary user interface showing exemplary engagement questions.

As shown in FIG. 6*d*, content suggestion frame 44 may include alerts 71 pertaining to the user's writing style, which allow the user to tweak his or her content for improved engagement with the target audience, or stickiness by encouraging the audience to continue reading the content. For example, the analysis engine module 19 analyses the content to determine the tone of the content, based on the subject matter of the content and the target audience, including the vocabulary, grammar and writing style. For example, analysis engine module 19 may provide suggestions 71 to set an appropriate tone for the target audience, such as: "The tone of your document is too serious for your audience. Consider being more playful with your words.", among others. With respect to vocabulary, the suggestions module 20 may provide suggestions 71 such as: "You are not using enough power words. Power words will make your content more interesting. Look at adding more", or "Your text needs to make your audience touch, taste, smell, hear, and see what you are writing about. Try adding some sensory words to help them experience it rather than read it", among others. Suggestions pertaining to grammar may include "Be sure to maintain the $2^{nd}$ person writing style. Incorporate words such as you' and 'your' more often."

Figure 7A:
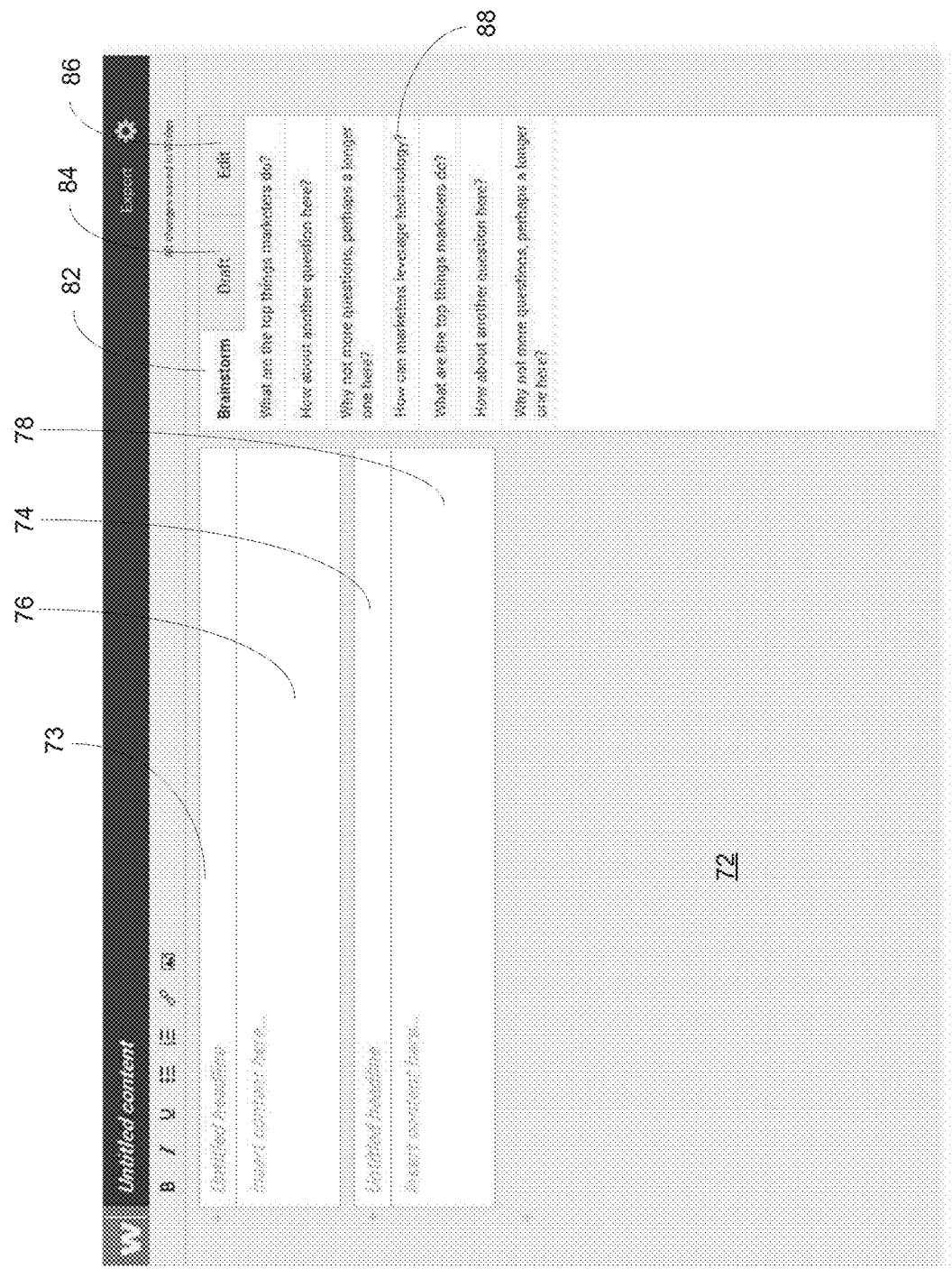
FIG. 7a is an exemplary user interface with exemplary questions.

In yet another embodiment, there is a provided an exemplary user interface associated with a content platform 16 executable in a native environment, and comprising a content frame 72 having a plurality of headline input fields 73, 74 and content input fields 76, 78 for entering content associated with the headlines 73, 74, as shown in FIG. 7*a*. Additional headlines and associated content may be added by selecting a "+" button. Alongside the content frame 72 is content suggestion frame 80 with a plurality of selectable tabs 82, 84, 86 associated with suggestions pertaining to brainstorming, drafting and editing. For example, when tab 82 is selected, a plurality of dynamic prompts 88, such as, thought provoking questions 88 which aid in brainstorming about the headline are presented.

Figure 7B:
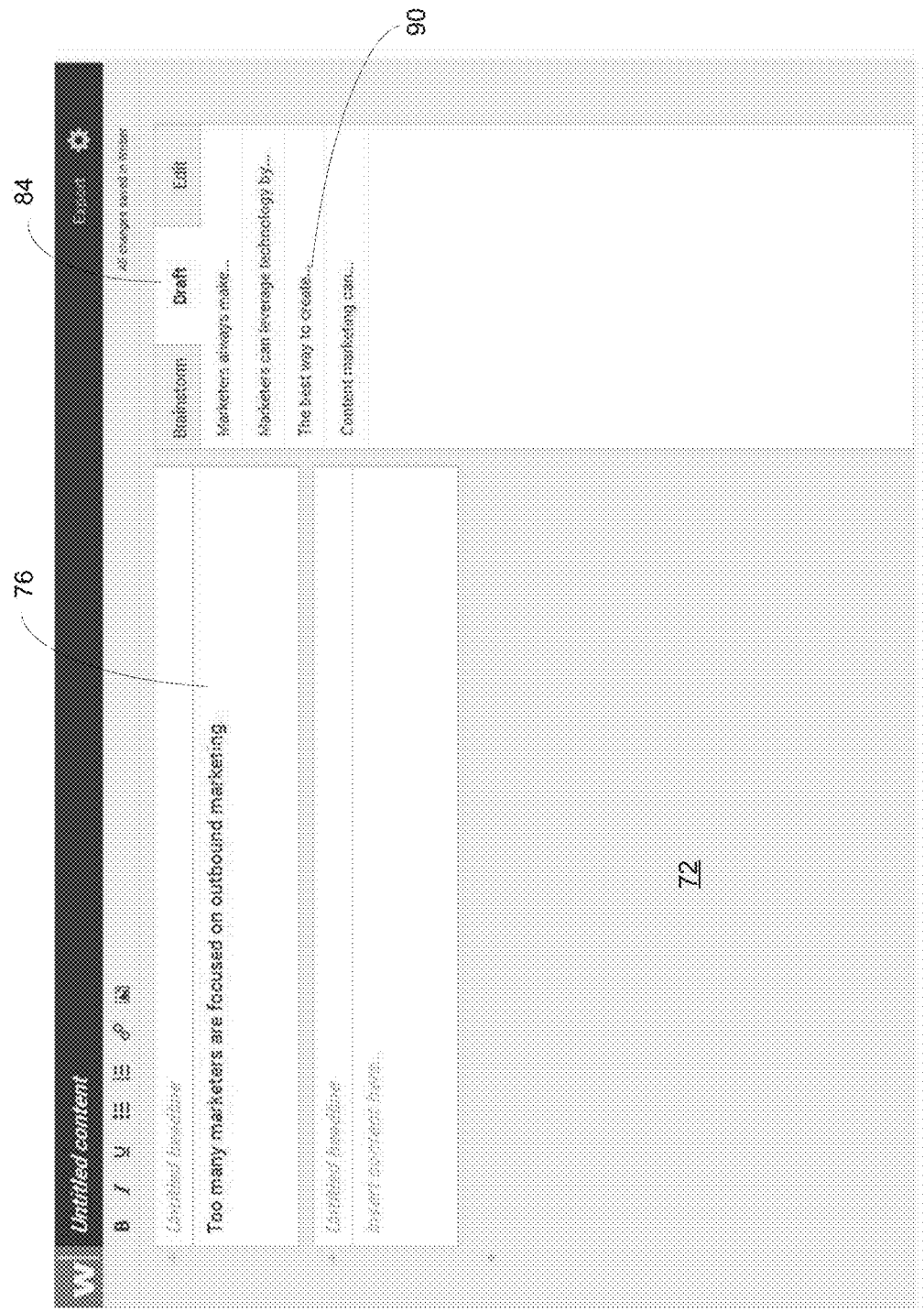
FIG. 7b is an exemplary user interface with exemplary content suggestions.
Figure 7C:
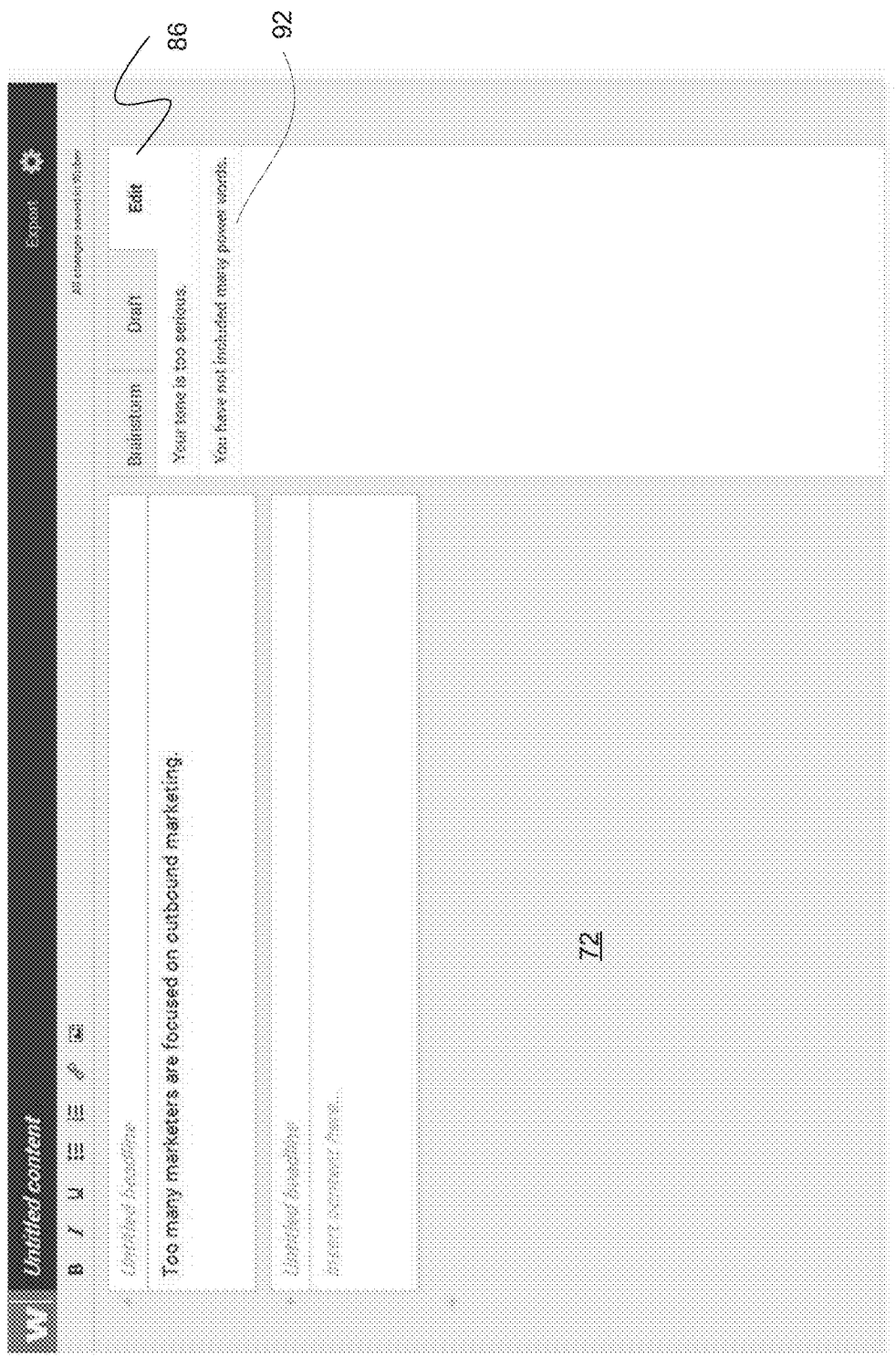
FIG. 7c is yet another exemplary user interface showing exemplary engagement suggestions.

In FIG. 7*b*, exemplary content suggestions 90 are shown in content suggestion frame 80 when tab 84 is selected. As can be seen, the content suggestions 90 are in the form of partial sentences for completion by the user, and provide an outline for the content. Selecting tab 86 reveals a plurality of content engagement suggestions 92 that help the user to set an appropriate tone for the content in accordance with the target demographic, as shown in FIG. 7c. Accordingly, the content engagement suggestions 92 permit editing of the content to suit the target demographic.

While the suggestions are shown as appearing in the content suggestion frame 44 or 80 alongside the content frame 40 or 72, the suggestions or prompts may also occur or appear within the document in the content frame 40 or 72.

In another embodiment, there is provided an application program interface (API) that facilitates communications between a content creation platform 16 resident at remote computing system 14 and a client application (that is, an executing computer program, e.g. a word-processing program or content management system, such as, Microsoft Word®, or Google Drive®, Google Chrome®, HubSpot®, Marketo®, Eloqua®, Pardot®, or Wordpress®). For example, following a user login and authentication process, the user creates content using the client application and the API which generally includes a command processor, processes the forwards the content being created in real-time to the remote computing system 14 for processing by the aggregator 18 and analysis engine module 19. After analysis and aggregation, the suggestion module 20 transfers suggestions or dynamic prompts through the API to the client application for viewing, editing, or further processing at the direction of the user.

In another embodiment, a plurality of users may work collaboratively on a single piece of content.

Figure 8A:
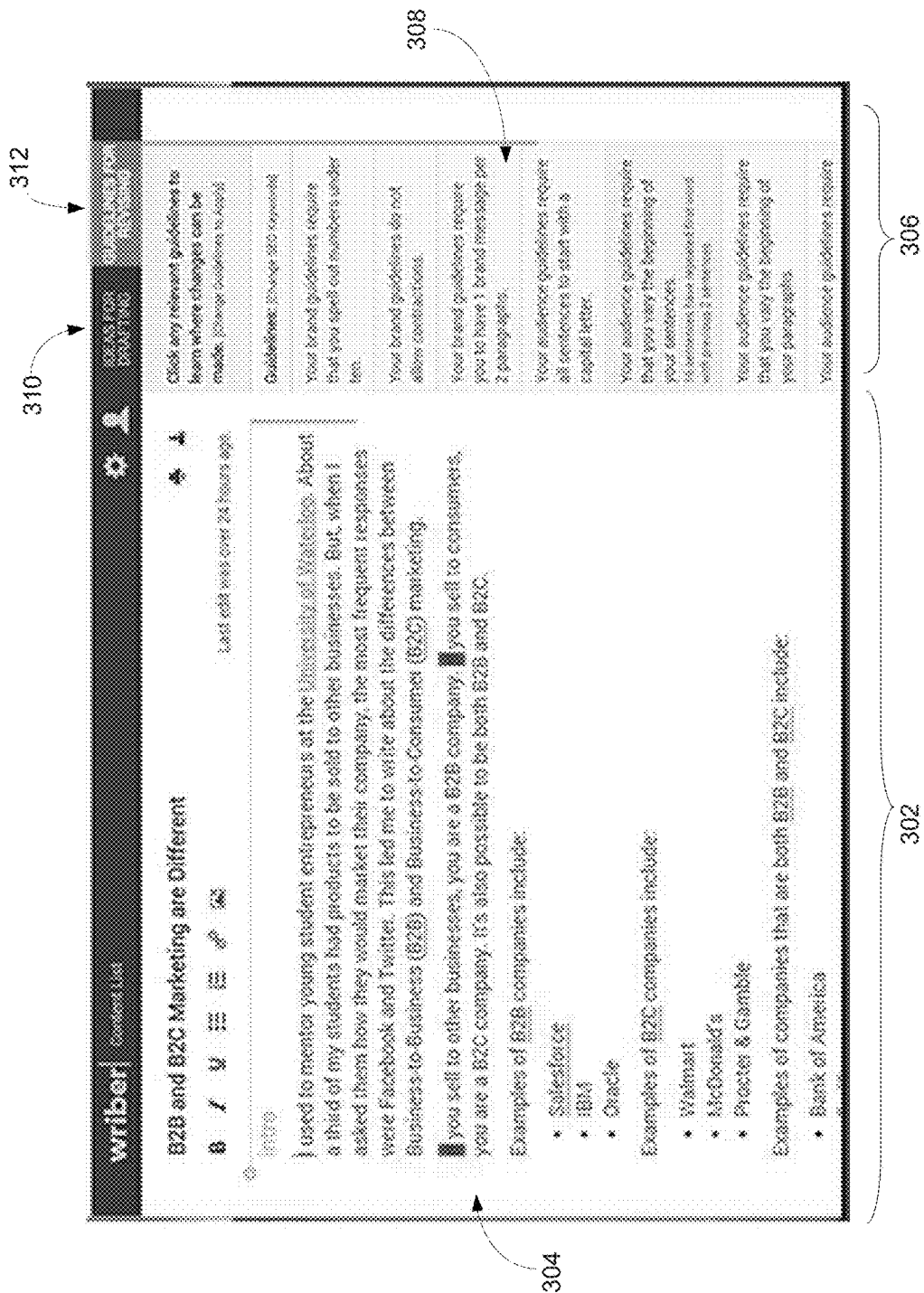
FIGS. 8a to 8f show exemplary user interfaces for providing guideline standards for content.

In yet another embodiment, multiple documents may be created from one document, such that each of the multiple documents are geared towards a particular segment, and is consistent with the user or organization by customizing the content according to the brand guidelines, audiences, and mediums. For example, a document created for internal distribution within an organization may be repurposed for an external audience, in the form of a white paper or blog post. FIG. 8a shows an exemplary user interface 300 comprising portion 302 having document content 304 and portion 306 having suggestion content 308. The suggestions may be presented to a user while drafting original content 308 by selecting "Ideas for drafting" tab 310, and may include suggestions for revising the original content 308 invoked by selecting "Guidelines for Revising" tab 312.

Figure 8B:
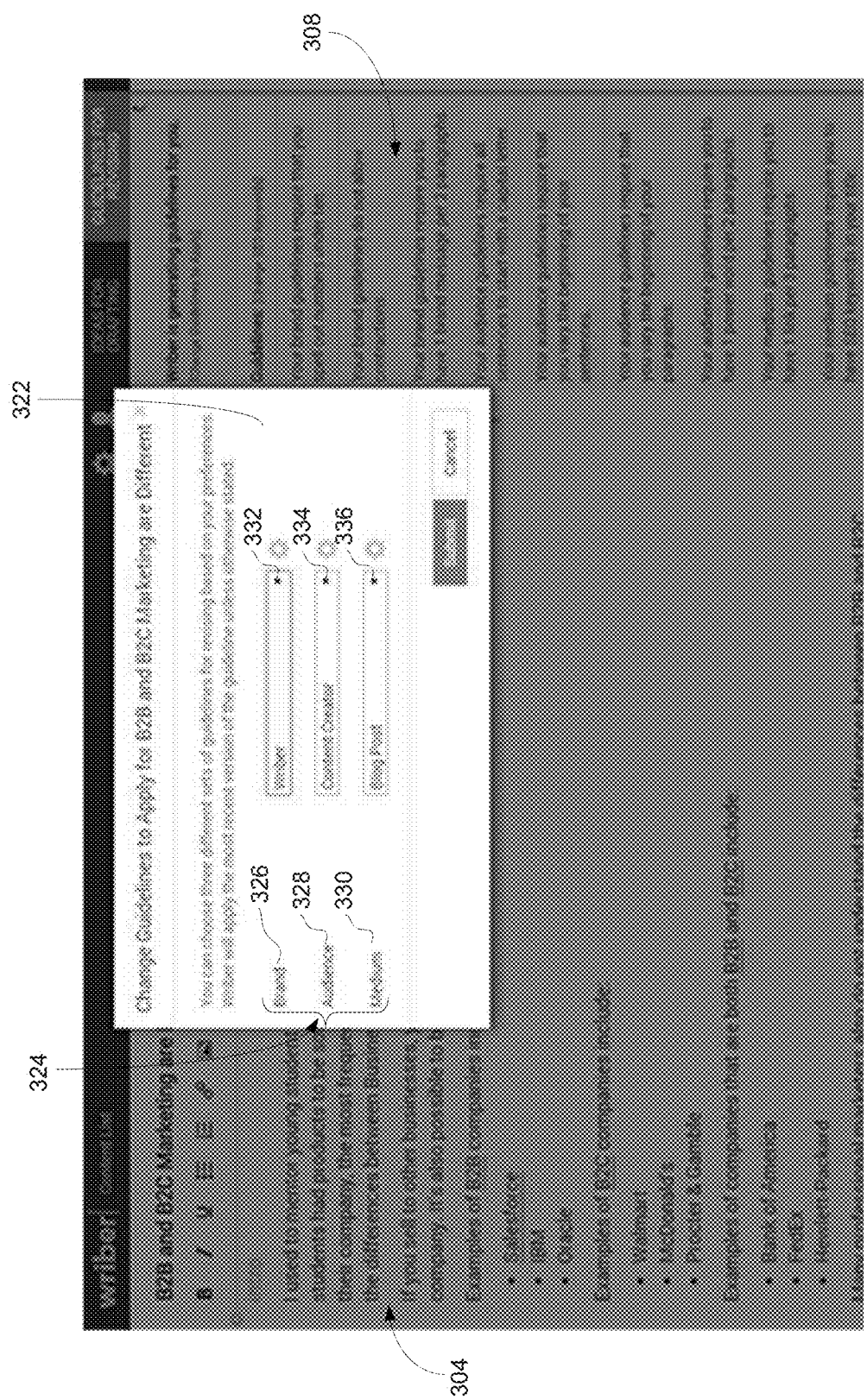

FIG. 8b shows an exemplary user interface 320 which allows a user to select the guideline standards to apply to a document, such as original content 308. A non-persistent window 322 comprises a plurality of guideline standards 324 for revising content, such as brands 326, audiences 328, and mediums 330. Each of the guideline standards 326, 328, and 330 include a plurality of selectable options accessible via a drop-down menu 332, 334 and 336, for example. Accordingly, a user can select different combinations of standards 324, and the original content 308 is used to derive desired targeted content. Each guideline standard 326, 328 or 330 is associated with a database with stores various options pertaining thereto.

Figure 8C:
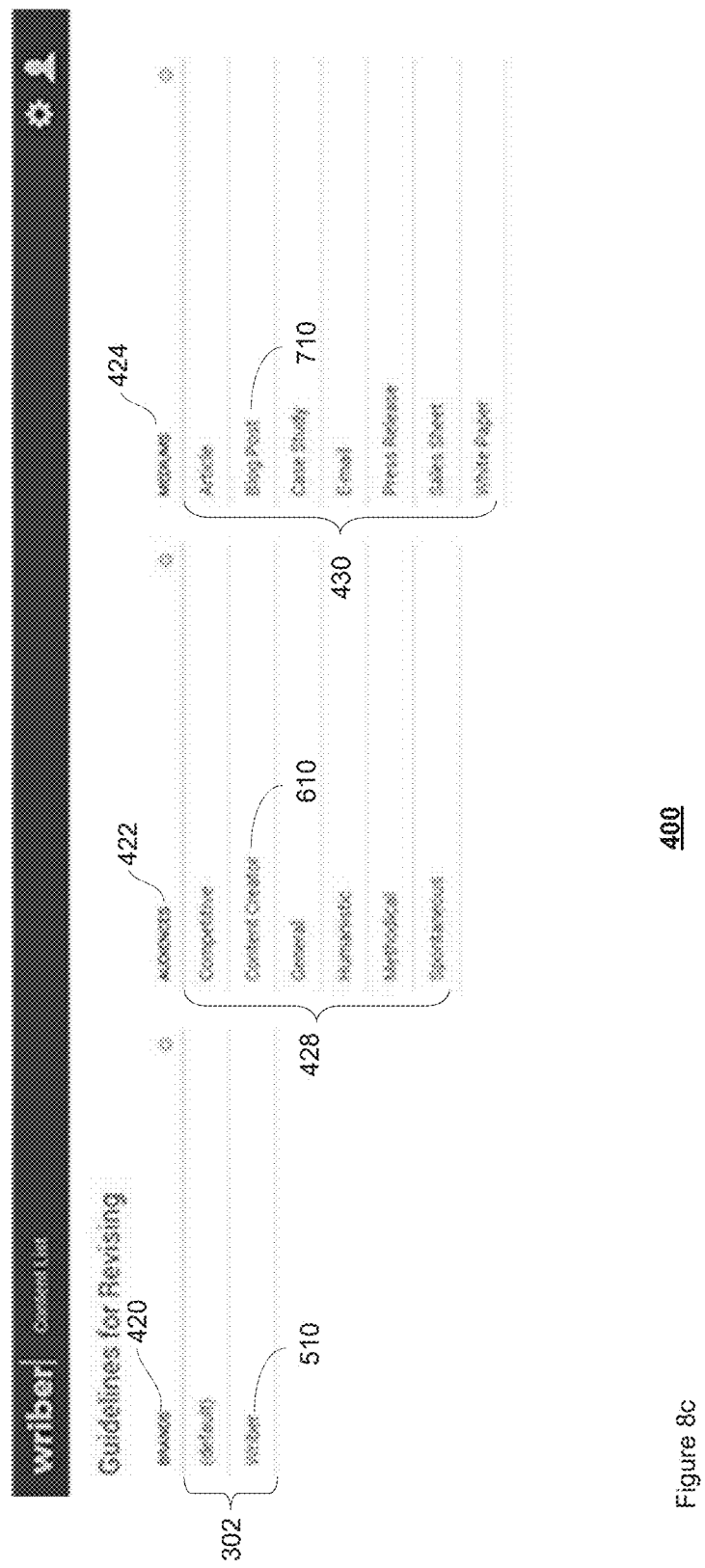

FIG. 8c shows an exemplary user interface 400 for configuring the guidelines for revising content 308. Exemplary guidelines include brands, audiences, and mediums, which are associated with "Brands" tab 420, "Audiences" tab 422, and "Mediums" tab 424, respectively. For example, "Brands" tab 420 is associated with a list of brands 426, and "Audiences" tab 422 is associated with a plurality of choices 428 such as competitive, content creator, general, humanistic, methodical and spontaneous, among others. "Mediums" tab 424 is associated with a list of choices 430 such as article, blog post, case study, email, press release, sales sheet and white paper.

Figure 8D:
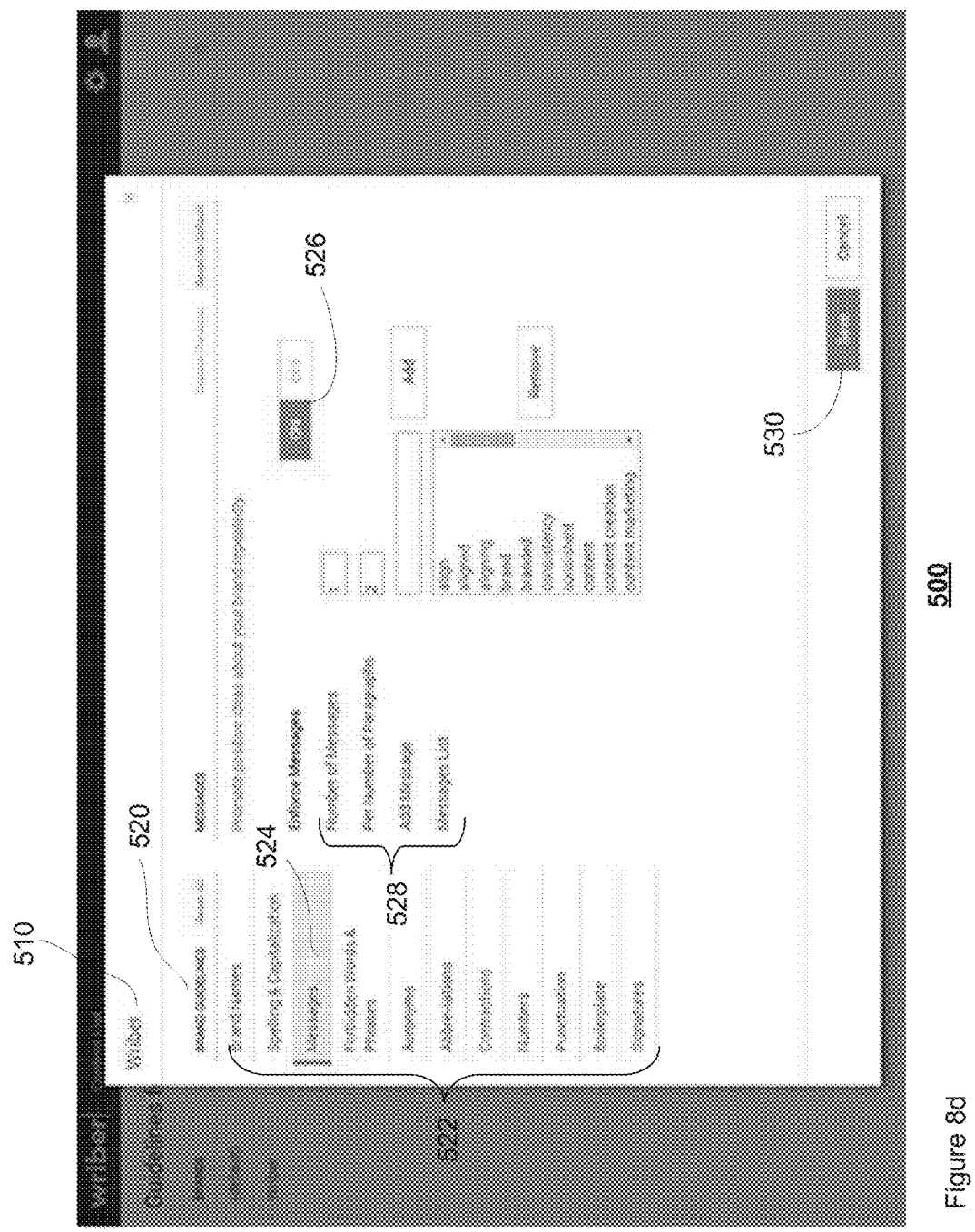

FIG. 8d shows an exemplary user interface 500 following selection of a brand 510, such as "Wriber" from user interface 400. Accordingly, user interface 500 comprises band guidelines 520 with selection items 522 of brand names, spelling and capitalization, messages, forbidden words and phrases, acronyms, abbreviations, contractions, numbers, punctuation, boilerplate and signatures. Each of the selection items 522 is associated with a tab or button, which when selected invokes an appropriate screen for further configuration. For example, selection of "Messages" tab 524 invokes a toggle switch 526 to elect whether or not enforce messages; and when a choice to enforce messages is elected then a plurality of message options 528, such as number of messages, number of messages per paragraph, add message and message list are presented. Once the selections have been selected, the brand guidelines pertaining to the message to be applied to content 308 are saved via "Save" button 530. Similar actions are performed for any one of the other items 522 in order to create overall brand guidelines.

Figure 8E:
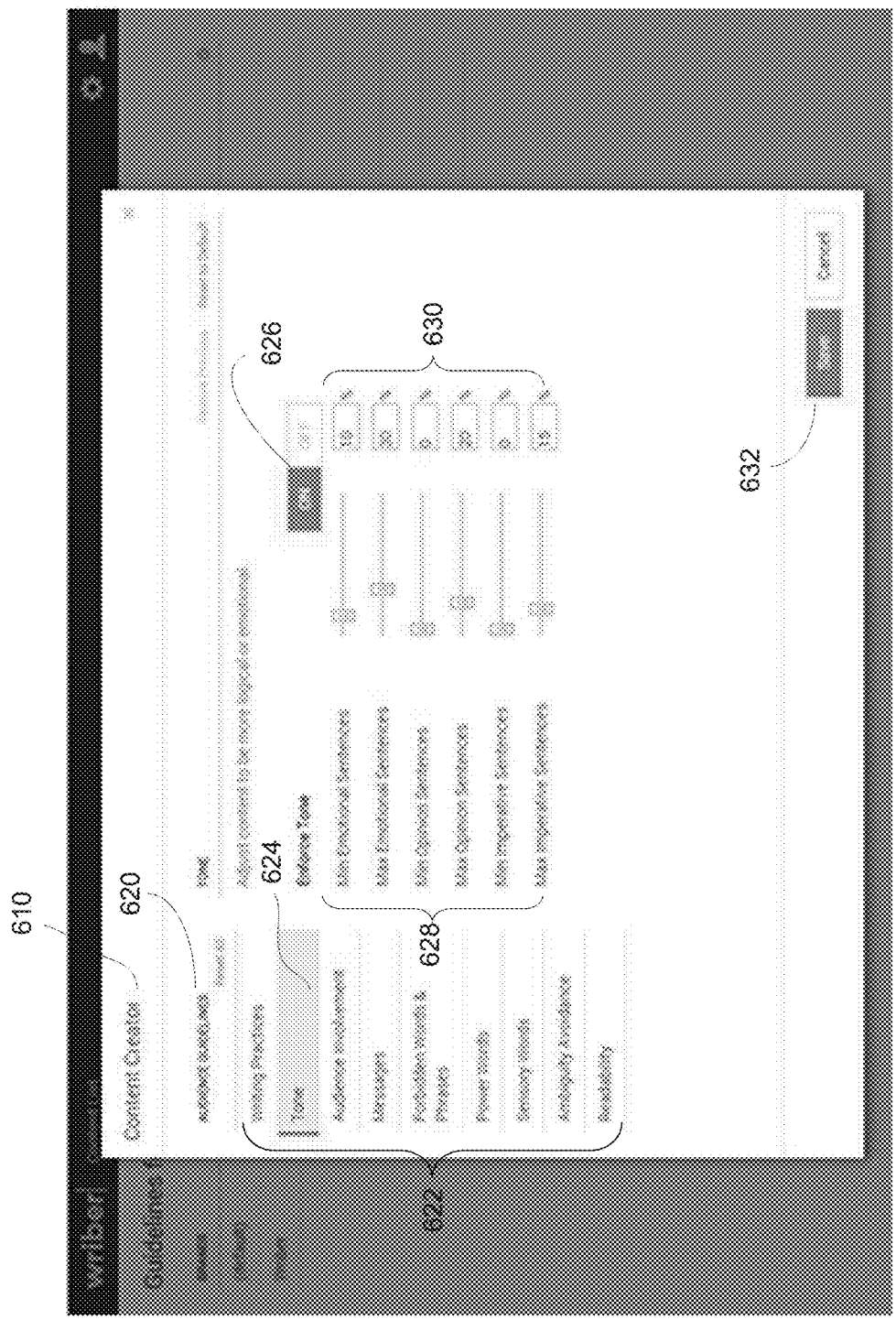

FIG. 8e shows an exemplary user interface 600 which allows a user to create content directed towards to a particular audience, following selection of a content creator 610 from FIG. 8c. Accordingly, user interface 600 comprises audience guidelines 620 with selection items 622 of writing practices, tone, audience involvement, messages, forbidden words and phrases, power words, sensory words, ambiguity avoidance and readability. Each of the selection items 622 is associated with a tab or button, which when selected invokes an appropriate screen for further configuration. For example, selection of "Tone" tab 624 invokes a toggle switch 626 to elect whether or not enforce a tone associated with a message, and when a choice to enforce a particular tone is elected then a plurality of tone options 628, such as minimum number of emotional sentences, maximum number of emotional sentences, minimum number of opinion sentences, maximum number of opinion sentences, minimum number of imperative sentences and maximum number of imperative sentences are presented. A desired level of the tone of a message may be defined by a user, such as via a sliding bar associated with each of the tone options 628. Once the selections have been selected, the audience guidelines to be applied to content 308 are saved via "Save" button 632. Similar actions are performed for any one of the other items 622 in order to create overall audiences guidelines.

Figure 8F:
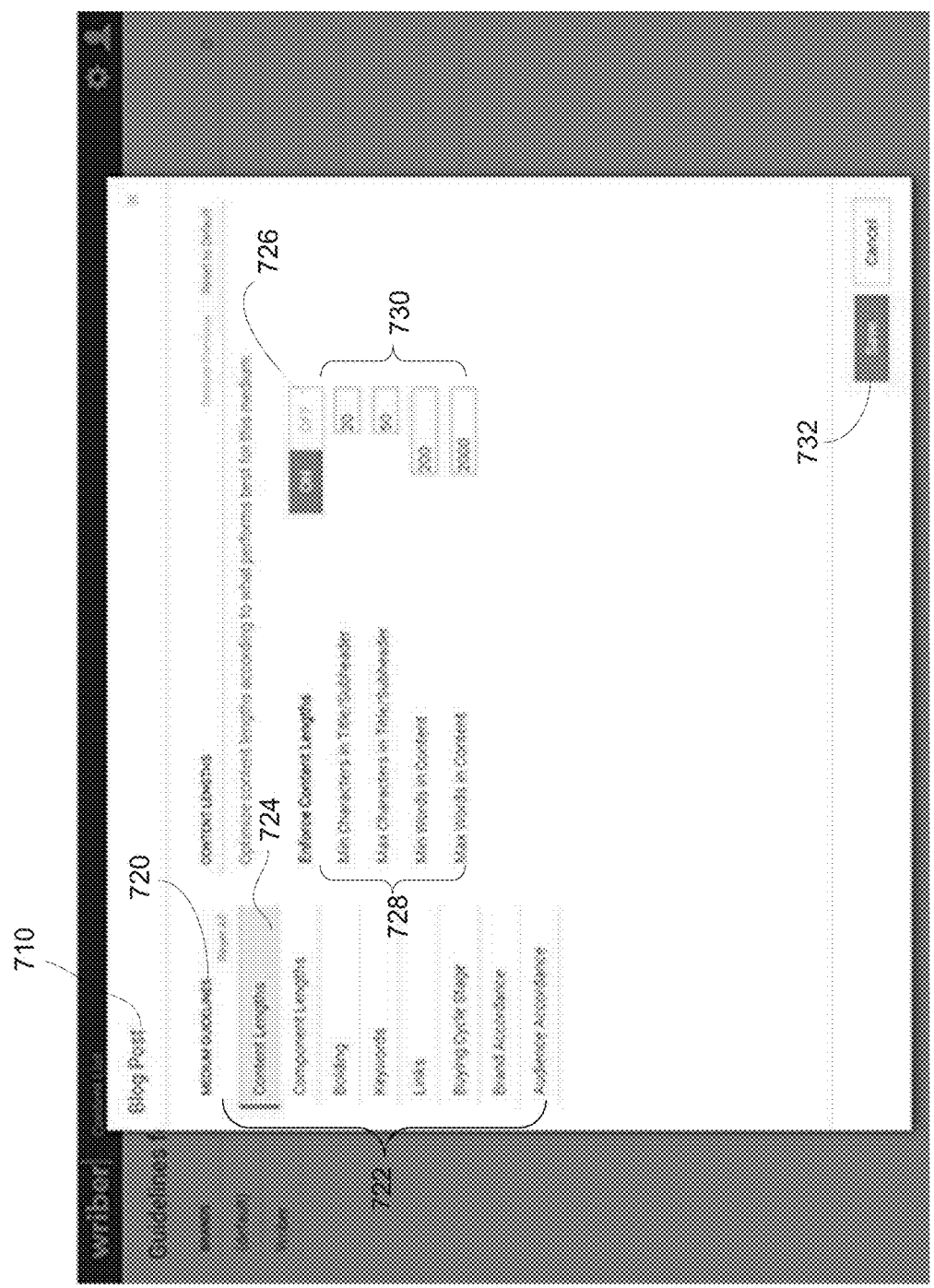

FIG. 8f shows an exemplary user interface 700 which allows a user to create content directed towards to a particular medium, following selection of a blog post 710 from FIG. 8c. Accordingly, user interface 700 comprises medium guidelines 720 with selection items 722, such as, component lengths, bolding, keywords, links, buying cycle stage, brand accordance and audience accordance. Each of the selection items 722 is associated with a tab or button, which when selected invokes an appropriate screen for further configuration. For example, selection of "Content Lengths" tab 724 invokes a toggle switch 726 to elect whether or not enforce content lengths, and when a choice to enforce a particular tone is elected then a plurality of content length options 728, such as minimum number of characters in a title or sub-header, maximum number of title or sub-header, minimum number of words in content 308, maximum number of words in content 308, are presented. Desired quantities pertaining to the content lengths may be defined by a user via data fields 730. Once the data fields have been populated, the medium guidelines associated with content lengths to be applied to content 308 are saved via "Save" button 732. Similar actions are performed for any one of the other items 722 in order to create overall medium guidelines.

Figure 9:
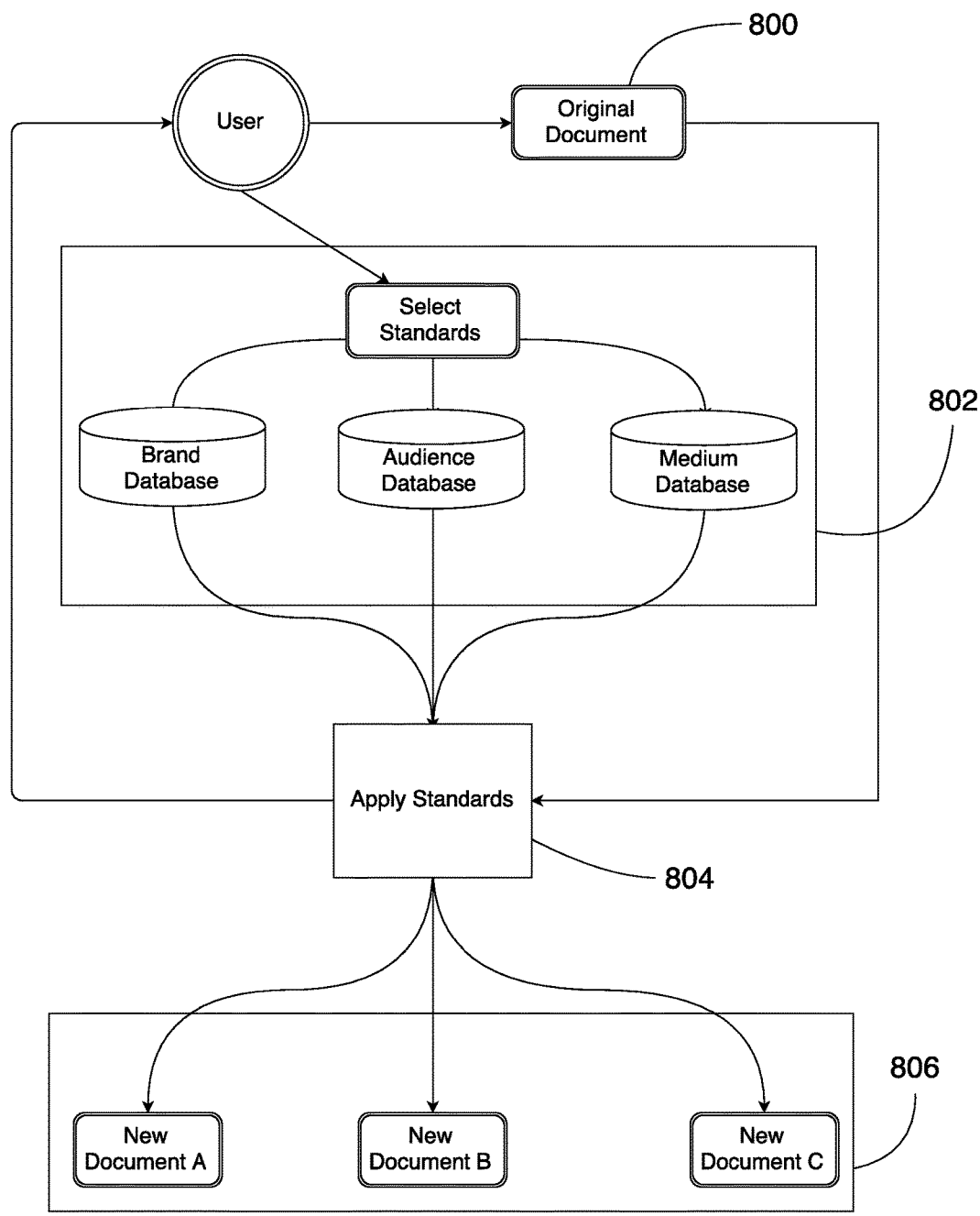
FIG. 9 shows a high level flow diagram illustrating exemplary process steps for repurposing content of a single document into a plurality of documents targeted for various segments.

FIG. 9 shows a flowchart with exemplary steps for repurposing content of a single document into a plurality of documents targeted for various segments. In step 800, original content 308 is presented on user interface 300 as shown in FIG. 8*a*. In next step 802, a selection of the guideline standards to apply to original content 308, such as brands 326, audiences 328, and mediums 330 is presented, as shown in FIG. 8*b*. Each of the guideline standards 326, 328, and 330 include a plurality of selectable options accessible, such as via a drop-down menu 332, 334 and 336, respectively. Accordingly, different combinations of standards 324 may be selected, and applied to the original content 308 to derive desired targeted content (step 804). Next, a plurality of documents based on the original content 308 is generated (step 806).

Figure 10A:
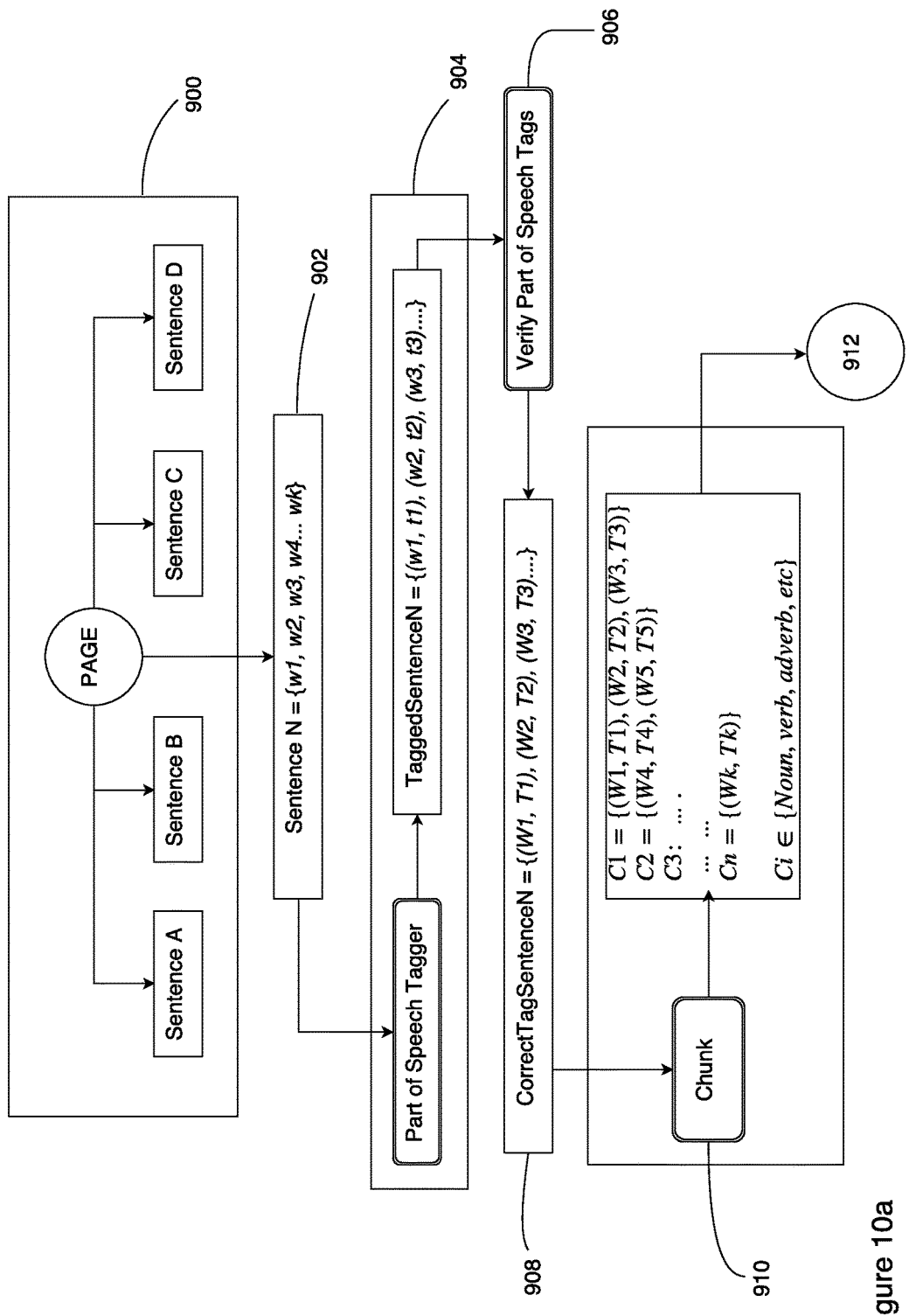
FIGS. 10a, 10b and 10c show a flowchart with exemplary steps for transforming unstructured text to form suggestions.
Figure 10B:
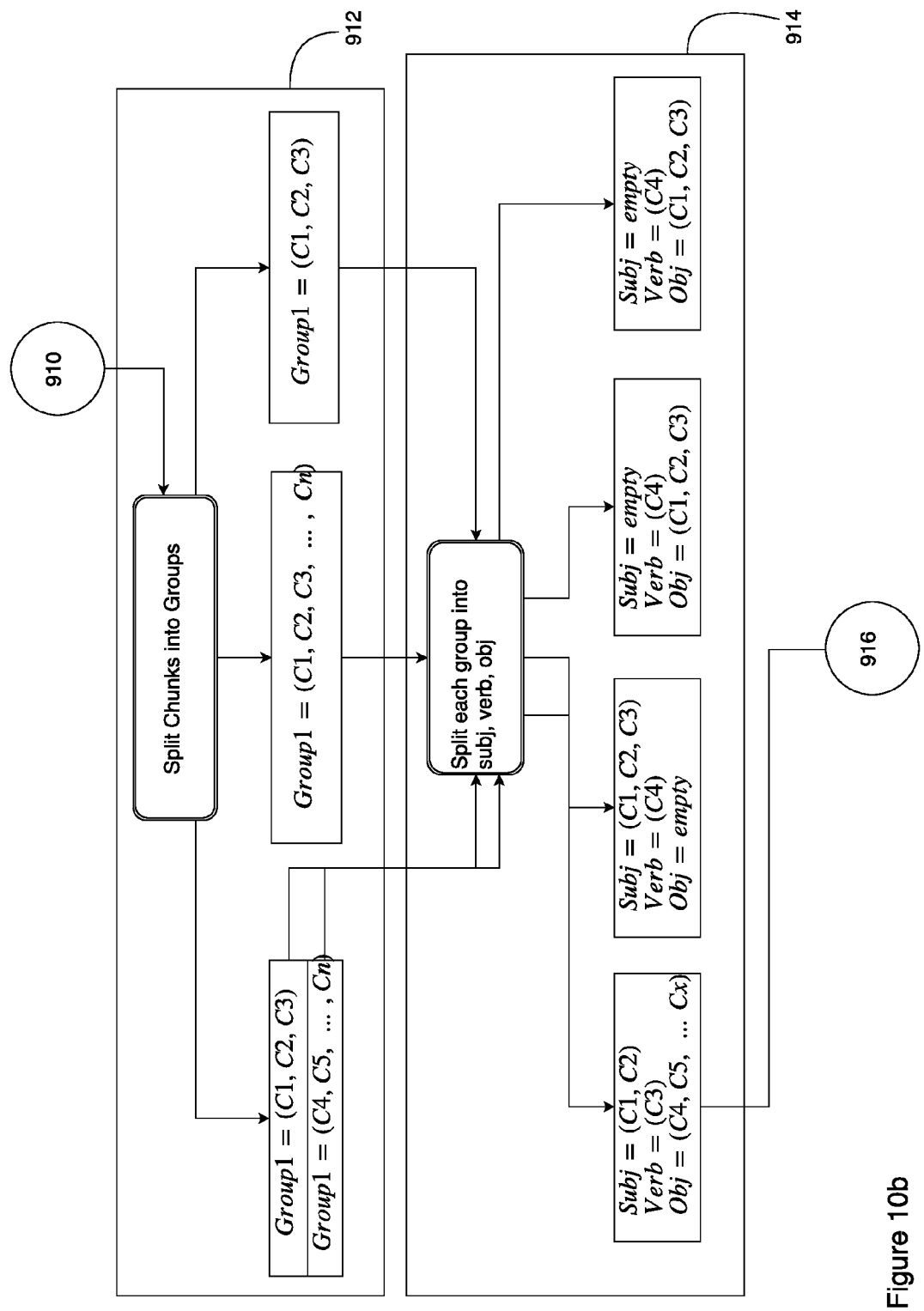
Figure 10C:
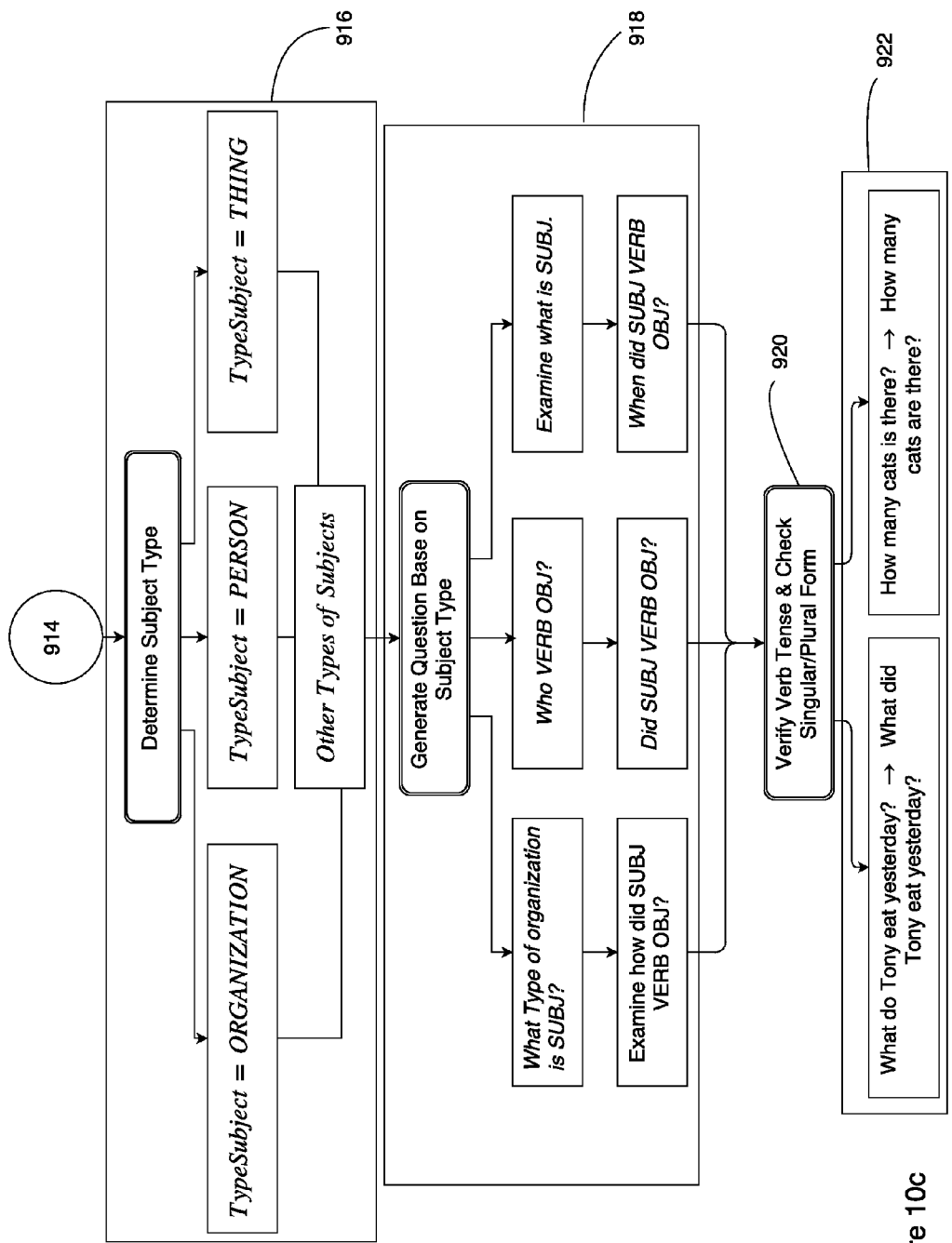

FIGS. 10*a*, 10*b* and 10*c* show a flowchart with exemplary steps for transforming unstructured text to form suggestions 314 by a text transformation module, as shown in FIG. 8*a*. In step 900 unstructured text (full sentences and questions) from relevant documents, or references is assembled and for each sentence (Sentence N), the following operations are performed: each sentence (N) is broken into individual words (step 902), and then the parts of sentence (N) (i.e. each word) is tagged using a tagging sub-module of the text transformation module having executable instructions executable by a processor (step 904) to determine a speech type of each word, such as, a verb, noun, pronoun, adverb, adjective, preposition, conjunction, or interjection. For instance, for a sentence such as: "Google is interested in Microsoft", the tagging sub-module outputs the sentence as: [(u'Google', u'NNP'), (u'is', u'VBZ'), (u'interested', u'JJ'), (u'in', u'IN'), (u'Microsoft', u'NNP'), (u'.', u'.')]. Next, a determination is made as to whether all the words are tagged correctly and have the correct capitalization (step 906), and any tagging errors are corrected (step 908). As an example, the word "lunch" can be used as a noun or a verb. Assuming the word "lunch" is tagged as a verb when it is indeed a noun, the tagging sub-module computes the probability of "lunch" being tagged incorrectly by looking into the database, and also by looking at the word before and after "lunch". If the probability of lunch being tagged incorrectly is high, then the tag for "lunch" is changed from a verb to a noun. Capitalization of words is also checked in a similar manner.

Following verification each word's capitalization and tag, the words are chunked together into "phrases" in order to form a tree-like structure of the text using a chunking sub-module of the text transformation module (step 910). For example, one possible chunking of the sentence: "Google is interested in Microsoft." is
(S
(NOUN Google/NNP)
(VRB is/VBZ)
(PRE interested/JJ in/IN)
(NOUN Microsoft/NNP)
./.)

Sometimes when the sentence is long, the sentence may have parts that talk about different aspects. Accordingly, the chunking sub-module splits the sentence into different logical phrases, such that the final generated suggestions are more focused (step 912). For instance, the sentence: "Wriber and Google are working together, but Google is interested in Microsoft." Will be chunked as:
(NOUN Wriber)
(AND and)
(NOUN Google)
(VRB are)
(NOUN working together)
(AND, but)
(NOUN Google)
(VRB is)
(PRE interested in)
(NOUN Microsoft)
and it can be split into:
(A) Wriber and Google are working together.
(NOUN Wriber)
(AND and)
(NOUN Google)
(VRB are)
(NOUN working together)
(B) Google is interested in Microsoft.
(NOUN Google)
(VRB is)
(PRE interested in)
(NOUN Microsoft)

After the sentence is split (or not split), the subject, verb and object of each phrase is determined (step 914).

For group A) above, the subject, verb, and object would be
Subject: Wriber and Google
Verb: are
Object: working together When the subject, verb and object of each sentence can not be determined then sentence is deemed 'incomplete' and therefore suggestions are not generate based off that sentence, otherwise the process proceeds to next step 916, in which the subject is categorized as an organization, time, person, or things, etc. For example, "Google" would be categorized as an ORGANIZATION, and "John A McDonald" would be marked as a PERSON.

Based on the subject's category, questions using combinations of the subject, verb, and object groups are generated (step 918) by a suggestion module, and at least one of the questions is used. In some instances only one or two of the generated suggestions are used or presented on user interface 300, and in some instances, all of the generated suggestions are used or presented. Exemplary questions or suggestions that may be generated from the sentence "Google is interested in Microsoft. " may include:
Discuss what sort of organization Google is?
Examine why Google is interested in Microsoft
Which organization is interested in Microsoft?

Next, a determination is made as to whether the final suggestion has the proper tense and singular/plural form (step 920), and corrections are made as necessary (step 922). For example, the suggestion: "What can John builds?" is corrected to "What can John build?" by correcting the verb tense. In yet another example, the suggestion: "Which organization are interested in Microsoft?" is corrected to "Which organization is interested in Microsoft?" by correcting the singular/plural form.

Figure 11A:
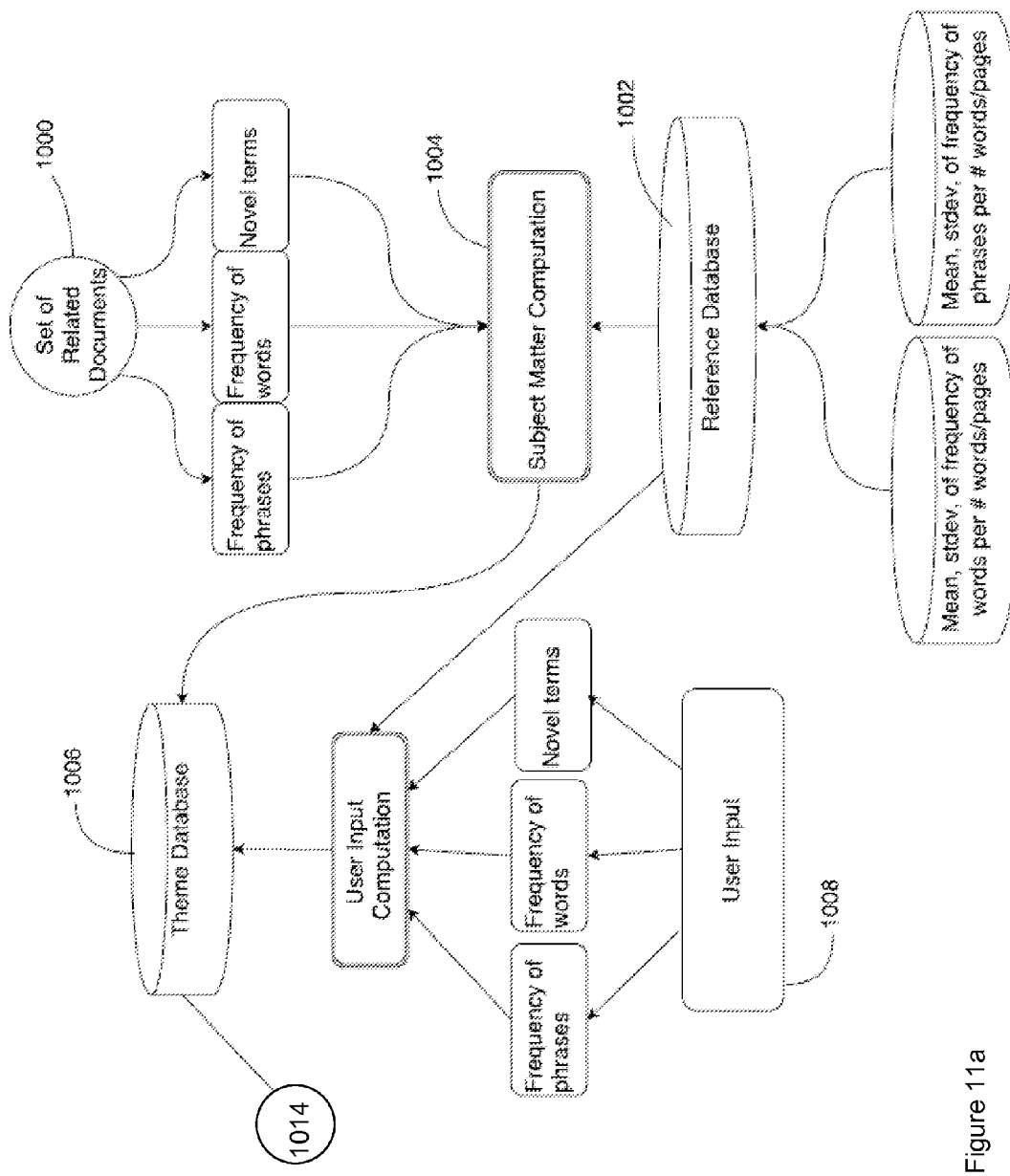
FIGS. 11a and 11b show a flowchart with exemplary steps for ranking the usefulness of a suggestion.
Figure 11B:
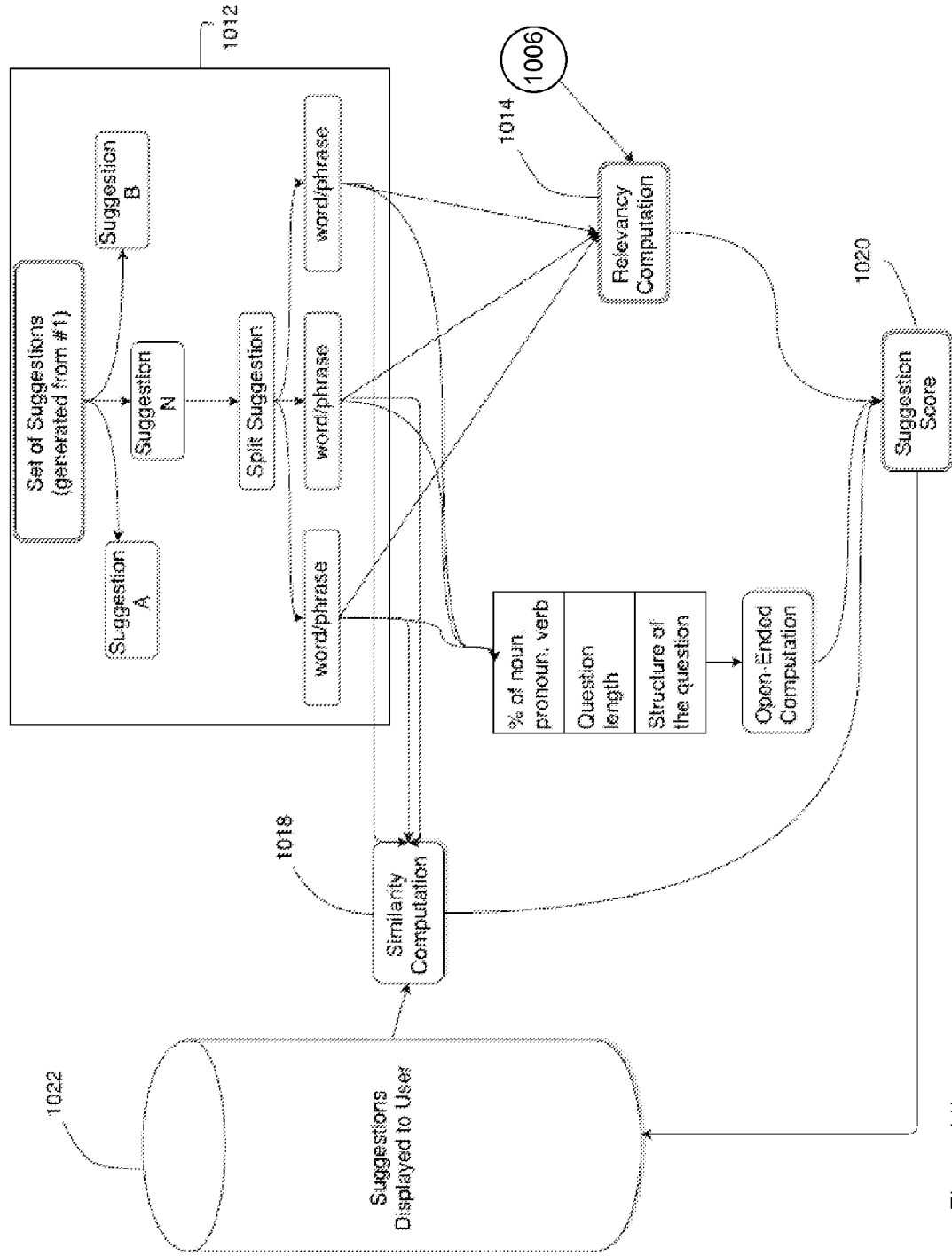

As stated in step 918 of FIG. 10*c*, in some instances only one or two of the generated suggestions are used or presented on user interface 300, and in some instances, all of the generated suggestions are used or presented. A ranking module determines which suggestions to present on user interface 300, based on the suggestion's usefulness to the user. As an example, a useful suggestion may be considered as being both relevant and open-ended, and an aid to the thinking process. Suggestions or questions that may be too vague, too specific, and/or don't apply to the document content 308 are therefore suppressed or removed, and therefore not presented. FIGS. 11*a* and 11*b* shows a flowchart with exemplary steps for ranking the usefulness of a suggestion. In step 1000, subject matter computation process is performed by retrieving a set of related documents is from a database based off what the user is writing about. For example, a search engine may be used to retrieve these documents (web pages) and a reference database storing common phrases and words (step 1002), and associated scores or weighting factors according to how frequently the words and phrases are used and what they mean. The text within the set of related documents is cross-referenced with the reference database in order to calculate common themes about a particular subject matter (step 1004) and the subject matter computations are stored in a theme database (step 1006).

In step 1008, the user also provides input such as the title of their document, subject of their document, and text of their document, a user input computation process is performed. Similar to the subject matter computation, user input information is cross-referenced with the reference database in order to calculate common themes about the document (step 1010). These computations are also stored in the theme database (step 1006).

Next, a set of suggestions from FIG. 10*c* are broken into different parts (words and phrases) (step 1012) and cross-referenced with the computations found in the theme database in order to determine how relevant that suggestion is to what the user is writing about (step 1014) to perform a relevancy computation process.

The set of suggestions is also analyzed for open-endedness by determining whether a suggestion is too vague or too specific via an open-ended computation process (step 1016).

The set of suggestions is also analyzed for similarity to previous suggestions, in order to supress any suggestion that has a very similar meaning to a previous suggestion, via a similarity computation process (step 1018).

A final suggestion score is computed by combining of the relevancy, open-ended, and similarity scores (step 1020), and the highest ranking (most useful) suggestions to are presented to the user interface 300 (step 1022).

In yet another embodiment, the content is created via speech using speech recognition methods and systems, with text-to-speech processing capabilities, rather than typing in content frame 40 or 72. Accordingly, system 10 comprises a configurable speech recognition engine that receives speech input captured by a microphone associated with the user device 12. The speech may be partially processed by client-side software resident on the user device 12, and the output of this partial processing is transmitted to the remote computing system 14 via the communications network 15 for recognition by the speech recognition engine, and the recognized speech is then converted to text at the remote computing system 14. Accordingly, a content management system or application program at the client-side may include API that provides speech recognition and input to the content frame 40 or 72. Alternatively, the recognized speech remains in audio format and may form part of an audio book, lecture or article.

In yet another embodiment, the content suggestions and/or engagement suggestions are provided to the user auditorily.

In yet another embodiment, the content is created via speech using speech recognition methods and systems, rather than typing on the content frame 40 or 72, as described above, and the content suggestions and/or engagement suggestions are provided auditorily.

In yet another embodiment, suggestions are generated, at least in part, based on the user's writing profile.

In another embodiment, the system 10 allows users to either select from a list of topic and subject suggestions based on a pre-defined topic and subject criteria, or select from a list of topic and subject suggestions in database 17*c*, based on previously authored work by the user, or a combination of both. Database 17*a* of topics and subjects and the user's writing profile in database 17*b* are integrated in order to exclude topics and subjects which are deemed uninteresting or not pertinent to a user's usual category of topics and subjects. As more users use the system 10, there is increased accuracy and relevance of the subjects and topics will be to the individual user.

The communications network 15 can include a series of network nodes (e.g., the clients and servers) that can be interconnected by network devices and wired and/or wireless communication lines (such as, public carrier lines, private lines, satellite lines, etc.) that enable the network nodes to communicate. The transfer of data between network nodes can be facilitated by network devices, such as routers, switches, multiplexers, bridges, gateways, etc., that can manipulate and/or route data from an originating node to a server node regardless of dissimilarities in the network topology (such as, bus, star, token ring, mesh, or hybrids thereof), spatial distance (such as, LAN, MAN, WAN, Internet), transmission technology (such as, TCP/IP, Systems Network Architecture), data type (such as, data, voice, video, multimedia), nature of connection (such as, switched, non-switched, dial-up, dedicated, or virtual), and/or physical link (such as, optical fiber, coaxial cable, twisted pair, wireless, etc.) between the correspondents within the network.

The computer system 12 may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system 12 described above or as an independent component.

The computer system 12 may be a general-purpose computer system that is programmable using a high-level computer programming language. Computer system 12 may be also implemented using specially programmed, special purpose hardware. In computer system 12, processor 21 is typically a commercially available processor such as the well-known Pentium class processor available from Intel Corporation. Many other processors are available. Such a processor usually executes an operating system which may be, for example, the Windows-based operating systems (e.g., Windows NT, Windows 7, Windows 8 operating systems) available from Microsoft Corporation, MAC OS System X operating system available from Apple Computer, one or more of the Linux-based operating system distributions (e.g., the Enterprise Linux operating system available from Red Hat Inc.), the Solaris operating system available from Sun Microsystems, or UNIX operating systems available from various sources. Many other operating systems may be used, and the invention is not limited to any particular operating system.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used. For example, various embodiments of the invention may be programmed using an object-oriented programming language, such as Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof The operating environment, in which the present invention is used, encompasses a standalone computing system as well as the general distributed computing system. Some of the elements of a standalone computer or a general purpose workstation computer 12, as shown in FIG. 2. The computer system 12 may be in the form of any kind of general processing structure, and may for example include any device, such as, a personal computer, laptop, tablet, computer server, personal digital assistant (PDA), cellular phone, smartphone. For example, various aspects of the invention may be distributed among one or more computer systems (e.g., servers) configured to provide a service to one or more client computers, or to perform an overall task as part of a distributed system. For example, various aspects of the invention may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

It will be apparent from this description that aspects of the present invention may be embodied, at least in part, in software. That is, the techniques may be carried out in a computer system or other data processing system in response to its processor, such as a microprocessor, executing sequences of instructions contained in memory. In various embodiments, hardwired circuitry may be used in combination with software instructions to implement the present invention. Thus, the techniques are not limited to any specific combination of hardware circuitry and software nor to any particular source for the instructions executed by the data processing system.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variations thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. For example, the steps recited in any of the method or process claims may be executed in any order and are not limited to the order presented. Further, the present invention may be practiced using one or more servers, as necessary. Thus, the preceding detailed description is presented for purposes of illustration only and not of limitation, and the scope of the invention is defined by the preceding description, and with respect to the attached claims.

The invention claimed is:

1. A computing device with a memory and a processing unit; an application stored in said memory and having a plurality of lines of computer code wherein said plurality of lines of computer code are executed by said processing unit of the computing device to generate a user interface of the application, wherein unstructured text is transformed into at least one suggestion for content creation; and said plurality of lines of computer code executable by said computing device to:

receive unstructured text from external sources having at least one sentence inputted by a user via said user interface to create said content;

disassemble said at least one sentence into individual words;

tag said individual words by determining a speech type for each of said individual words;

when said individual words are tagged correctly, chunk said individual words together into phrases to form a tree-like structure of the text;

dynamically generate at least one suggestion in real time based on said chunking, said at least one suggestion comprising at least one of a question, a sentence, a partial sentence, and a phrase, and wherein said at least one suggestion is a thought-provoking suggestion for triggering further thought provoking questions pertaining to said at least one sentence to aid said user create said content;

determine whether said at least one suggestion has a proper tense and singular/plural form;

provide said at least one suggestion when said at least one suggestion has the proper tense and singular/plural form, and output said at least one suggestion with the proper tense and singular/plural form to a window generated on said user interface.

2. The computing device of claim 1, wherein said speech type is at least one of a verb, noun, pronoun, adverb, adjective, preposition, conjunction, and interjection.

3. The computing device of claim 2, when said individual words are tagged incorrectly, said individual words are tagged repeatedly until said individual words are tagged correctly.

4. The computing device of claim 3, wherein when capitalization of said individual words is verified, said individual words are incorrectly capitalized are corrected.

5. The computing device of claim 4, wherein when said sentence is long, said sentence is split into different logical phrases, and at least a subject, verb and object of each phrase is determined.

6. The computing device of claim 5, wherein when said subject, said verb and said object of each sentence can he determined, said subject is categorized as at least one of an organization, time, person, or thing, otherwise said sentence is deemed to be incomplete and suggestions are not generated based off said sentence.

7. The computing device of claim 3, wherein when one of said individual words belongs to one or more speech types, then analyze immediate words adjacent to said one of said individual words to determine context of said one of said individual word.

8. The computing device of claim 7, wherein said one of said individual words is assigned said speech type with respect said context.

9. A system for transforming unstructured text into at least one suggestion for content creation, the system having:
a computing device with a memory and a processing unit;
an application stored in said memory and having a plurality of lines of computer code wherein said plurality of lines of computer code are executed by said processing unit of the computing device to generate a user interface of the application;
said application further comprising:
a tagging module executable by said processing unit to receive unstructured text from external sources having at least one sentence inputted by a user via said user interface to create said content; disassemble said at least one sentence into individual words; and tag said individual words by determining a speech type for each of said individual words;
a chunking module executable by said processing unit to chunk said individual words together into phrases to form a tree-like structure of the text, when said individual words are tagged correctly;
a suggestion module executable by said processing unit to dynamically generate at least one suggestion in real time based on said chunking, said at least one suggestion comprising at least one of a question, a sentence, a partial sentence, and a phrase, and said at least one suggestion is a thought-provoking suggestion for triggering further thought-provoking questions pertaining to said at least one sentence to aid said user create said content; determine whether said at least one suggestion has a proper tense and singular/plural form; provide said at least one suggestion when said at least one suggestion has the proper tense and singular/plural form; and output said at least one suggestion with the proper tense and singular/plural form to a window generated on said user interface.

10. The system of claim 9, wherein said one of said individual words is assigned said speech type with respect said context.

11. The system of claim 10, wherein said a speech type is at least one of a verb, noun, pronoun, adverb, adjective, preposition, conjunction, and interjection.

12. The system of claim 11, when said individual words are tagged incorrectly, said individual words are tagged repeatedly until said individual words are tagged correctly.

13. The system of claim 12, wherein when capitalization of said individual words is verified, said individual words are incorrectly capitalized are corrected.

14. The system of claim 13, wherein when said sentence is long, said sentence is split into different logical phrases, and at least a subject, verb and object of each phrase is determined.

15. The system of claim 14, wherein when said subject, said verb and said object of each sentence can be determined, said subject is categorized as at least one of an organization, time, person, or thing, otherwise said sentence is deemed to be incomplete and suggestions are not generated based of said sentence.

16. The system of claim 15, wherein when said at least one suggestion is generated using a combination of said subject, said verb and object groups.

17. The system of claim 16, wherein when said one of said individual words belongs to one or more speech types, then immediate words adjacent to said one of said individual words to determine context of said one of said individual words.

18. The system of claim 17, wherein said one of said individual words is assigned said speech type with respect said context.

* * * * *